United States Patent
Yoshida et al.

(10) Patent No.: US 6,566,835 B1
(45) Date of Patent: May 20, 2003

(54) NC MACHINE TOOL, AND METHOD OF CONTROLLING NC MACHINE TOOL

(75) Inventors: Jun Yoshida, Kanagawa (JP); Yoshikatsu Teraoka, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 0 days.

(21) Appl. No.: 09/868,587

(22) PCT Filed: Oct. 20, 1999

(86) PCT No.: PCT/JP99/05801

§ 371 (c)(1),
(2), (4) Date: Jun. 20, 2001

(87) PCT Pub. No.: WO01/29628

PCT Pub. Date: Apr. 26, 2001

(51) Int. Cl.$^7$ .................. G05B 19/404; B23Q 15/22
(52) U.S. Cl. .................. 318/569; 318/575; 318/600; 318/625; 318/632
(58) Field of Search ................ 318/568.22, 569, 318/574, 575, 600, 621, 625, 632, 641, 646, 648

(56) References Cited

U.S. PATENT DOCUMENTS

| | | | |
|---|---|---|---|
| 4,941,265 A | * 7/1990 | Heiland | 33/504 |
| 5,159,254 A | 10/1992 | Teshima | |
| 5,374,884 A | * 12/1994 | Koren et al. | 33/504 |
| 5,598,077 A | * 1/1997 | Matsubara et al. | 318/568.22 |
| 5,710,498 A | * 1/1998 | Yutkowitz et al. | 318/632 |
| 5,920,169 A | 7/1999 | Hamamura | |
| 6,060,854 A | * 6/2000 | Yutkowitz | 318/632 |

FOREIGN PATENT DOCUMENTS

| | | | |
|---|---|---|---|
| JP | 2606773 | 2/1997 | |
| JP | 09-179623 | * 7/1997 | ......... G05B/19/416 |
| JP | 2709969 | 10/1997 | |
| JP | 2853023 | 11/1998 | |

OTHER PUBLICATIONS

Japanese Unexamined Patent Publication (Kokai) No. 11–90769, dated Apr. 6, 1999.
Japanese Unexamined Patent Publication (Kokai) No. 6–284763, dated Jul. 10, 1994.
Japanese Unexamined Patent Publication (Kokai) No. 3–290706, dated Dec. 20, 1991.
Japanese Unexamined Patent Publication (Kokai) No. 2–012407, dated Jan. 17, 1990.
Japanese Unexamined Patent Publication (Kokai) No. 8–249031, dated Sep. 27, 1996.
Japanese Unexamined Patent Publication (Kokai) No. 10–63339, dated Mar. 6, 1998.
Japanese Unexamined Patent Publication (Kokai) No. 10–63325, dated Mar. 6, 1998.
Japanese Unexamined Patent Publication (Kokai) No. 5–080824, dated Apr. 2, 1993.

* cited by examiner

*Primary Examiner*—Bentsu Ro
(74) *Attorney, Agent, or Firm*—Paul & Paul

(57) ABSTRACT

The present invention relates to a method of controlling a numerically controlled machine tool having a plurality of feed shafts. Also, the present invention relates to a numerically controlled machine tool. According to the present invention, it is possible to solve conventional problems so as to realize highly accurate machining even when a moving body of the machine is moved at high speed. As the means for solving the problems, an appropriate command corresponding to a frictional force of the feed mechanism of the numerically controlled machine tool and also corresponding to a change in the weight of a workpiece is estimated by calculation, and the thus estimated command is outputted into the drive unit of the feed shaft motor so as to drive the feed shaft motor.

20 Claims, 12 Drawing Sheets

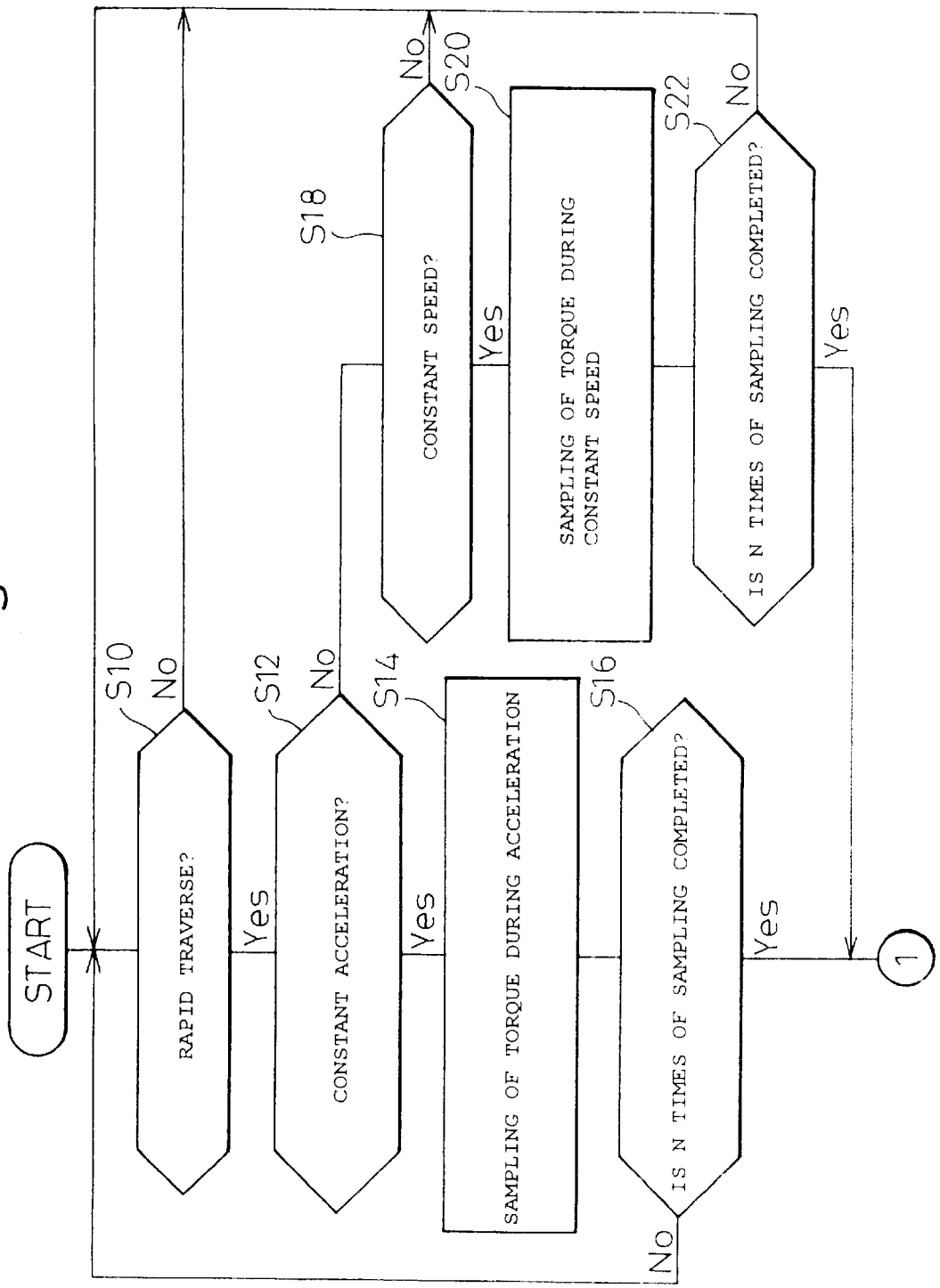

NC MACHINE TOOL, AND METHOD OF CONTROLLING NC MACHINE TOOL

TECHNICAL FIELD OF THE INVENTION

The present invention relates to a method of controlling a numerically controlled machine tool such as a milling machine, machining center or electric discharge machine having a plurality of feed shafts of three orthogonal axes of X, Y and Z or having a plurality of feed shafts of at least one of the rotary shafts of axes of A, B and C in addition to the three orthogonal axes of X, Y and Z. Further, the present invention relates to a 15 numerically controlled machine tool. In other words, the present invention relates to a new technique of a numerically controlled machine tool by which a workpiece can be machined with high accuracy even at a high feed speed.

DESCRIPTION OF THE PRIOR ART

Concerning a numerically controlled machine tool, it is required that a workpiece is accurately machined in a short period, that is, it is required that a workpiece is highly efficiently and accurately machined. In general, it is known that machining accuracy is deteriorated when the feed speed of a machine tool is raised. This deterioration in machining accuracy is caused by a lost motion of the feed shaft and a delay of servo-control of the numerically controlled machine tool. Therefore, in the case of a numerically controlled machine tool, in order to conduct machining with high accuracy even when the feed speed is raised to a high value, backlash of the feed shaft is corrected and further friction of the feed shaft is corrected, and furthermore speed adjusting control of the feed shaft is conducted according to the weight of a workpiece and the temperature of the feed shaft motor. For example, the following prior arts are provided.

The first prior art is disclosed in Japanese Patent Publication No. 2606773, which discloses an acceleration control method and device in a servo system. According to this prior art, lost motions of the feed shaft caused by backlash, elastic deformation and static friction in the case of inversion in the direction of movement of the feed shaft are corrected by conducting the most appropriate acceleration control corresponding to the respective characteristics so as to reduce the deterioration of machining accuracy. To accomplish the above object, the first, second and third acceleration for compensating the lost motions caused by backlash, elastic deformation and static friction in the feed system are added to the speed commands of the servo control unit, so that the delay caused by the lost motions can be immediately made up.

The second prior art is a servo motor control method disclosed in Japanese Patent Publication No. 2709969.

According to this method, for the object of conducting the most appropriate backlash correction even when the cutting condition fluctuates, the target value is set at a value, the sign of which is reverse to that, of the integrator of the speed control unit before the direction of movement is inverted, and a value obtained when the value of the integrator of the speed control unit is subtracted from the target value is multiplied by a constant, and the thus obtained value is made to be a value of backlash acceleration in the speed control unit, for example, a value obtained when a value proportional to the square root of a positional deviation at the moment when the direction of movement is inverted is multiplied, and the thus obtained value is made to be a value of backlash acceleration in the speed control unit.

The third prior art is a method and device of controlling acceleration and deceleration of a machine tool disclosed in Japanese Unexamined Patent Publication No. 11-90769. According to this prior art, for the object of ensuring high machining accuracy and shortening the machining time when the weights of moving things such as a tool and a workpiece are changed in the case of replacing them, the drive system is controlled by an acceleration corresponding to the rigidity of the machine tool, machining accuracy (allowable error) and weight of the workpiece. That is, there is disclosed a technique in which the acceleration is changed corresponding to the load inertia which has been previously set.

The fourth prior art is a speed control unit of a servo motor disclosed in Japanese Unexamined Patent Publication No. 6-274763. This patent publication describes a torque observer by which the load torque is estimated from the output torque of the feed shaft motor and the acceleration of an object to be driven.

According to this technique, a change in the estimated value of the load torque is detected, and the load inertia is estimated, and then the load inertia which has been set in the torque observer is renewed.

The fifth prior art is a method and device of controlling a numerically controlled device disclosed in Japanese Patent Publication No. 2853023. According to this technique, for the object of preventing the feed shaft motor from overheating even when the motor is continuously operated being frequently accelerated and decelerated because the feed shaft is quickly rotated, the temperature of the feed shaft motor is measured, and the thus measured temperature is compared with the predetermined temperature data allowed to the feed shaft motor. According to the result of comparison, the acceleration and the deceleration curve of the feed shaft are controlled being changed.

According to the first prior art, the acceleration is found, and the thus found acceleration is added to a speed command value of the servo control unit. In a numerically controlled machine tool, which is actually used, it is finally required that how high torque command value or how high electric current command value is outputted to the feed shaft motor drive means. Therefore, when the speed command value in the middle of servo control is changed like the first prior art, a delay is caused when the command value is converted into a torque command value or an electric current command value and arrives at the feed shaft motor drive means.

According to the second prior art, the backlash acceleration calculated according to the positional deviation is made to be a backlash acceleration in the speed control unit. Therefore, a delay still exists in the servo system composed of a positional feedback control means and speed feedback control means.

According to the third prior art, the load inertia is previously set at a predetermined value. Therefore, the acceleration is changed according to the weight of a workpiece. That is, when the weight of a workpiece is heavy, the acceleration is raised to an allowable limit, and when the weight of a workpiece is light, the acceleration is lowered. When the acceleration is lowered, the machining efficiency is deteriorated.

The fourth prior art relates to a torque observer for estimating the load torque of a common servo motor. The load torque is estimated according to the speed command value, and the load inertia is estimated according to the estimated load torque. Then, the estimated load inertia is sent to the transfer function of the mechanical system so as to conduct feed control. According to the aforementioned technique, since the load inertia is an estimated value, a delay is caused in the feed shaft of the device, and the machining accuracy is affected by the delay.

According to the fifth prior art, the time constant of acceleration and deceleration is controlled in accordance with the temperature of the feed shaft motor, so that the feed shaft motor is prevented from overheating without changing the command feed speed. When this technique is adopted, it is possible to prevent the feed shaft motor from overheating, however, the time constant of acceleration and deceleration is increased, and the machining accuracy is deteriorated.

Other than the above prior arts, there are provided conventional methods in which correction of backlash or correction of friction is conducted. However, according to these conventional methods, the same correction value is used without giving consideration to the speed and acceleration of a moving object. In the case of an actual machining operation, when an object of the same profile is machined at a different feed speed, the dimension of machining changes when the conventional correction is conducted. When a curved face, the radius of curvature of which is different, is machined over a plurality of quadrants, the feed speed of at least one feed shaft once becomes zero in the case of changing over the quadrant. After that, the direction of the feed speed is inverted. Therefore, an acceleration is generated. In this case, the acceleration is changed by the radius of curvature. When the conventional correcting method is applied to the aforementioned case, the machining size is changed. That is, in the case of inverting a direction of movement and also in the case of starting a movement after a temporary stoppage, it is necessary to conduct correction of friction according to the speed and acceleration of a moving object.

Concerning the value of load inertia of the conventional numerically controlled device, for example, the value of load inertia in the case of loading a workpiece, the weight of which is half of the weight of a maximum workpiece to be loaded, is adopted as a constant value. A value found when this constant value is multiplied by the acceleration at each time is outputted to the feed motor drive means as a torque command. Under the above controlling condition, even if the load inertia is increased when a heavy work is loaded, it is impossible to generate a necessary torque command. Therefore, the actual movement of the feed shaft is delayed with respect to the movement command. Even if the load inertia is decreased when a light workpiece is loaded, a torque command, which is unnecessarily high, is generated, so that the moving body is given a shock. As a result, the feed speed fluctuates, and machining can not be performed with accuracy and the thus obtained profile is deteriorated. Further, although the weight of a workpiece changes every second, that is, although the load inertia changes, the torque command is kept constant. In other words, servo control can not follow the load condition which changes every second. As a result, the machining accuracy is changed.

SUMMARY OF THE INVENTION

The present invention has been accomplished to solve the above problems of the prior art. It is an object of the present invention to provide a method of controlling a numerically controlled machine tool. Also, it is an object of the present invention to provide a numerically controlled machine tool capable of conducting machining with high accuracy even if a moving object of the machine is moved at high speed.

It is another object of the present invention to enhance the machining accuracy in the case of machining a profile or a curved face by moving a plurality of feed shafts simultaneously.

It is still another object of the present invention to conduct machining with high accuracy by giving consideration to a change in the dynamic frictional force and also a change in the static frictional force in the case of inverting a direction of movement of the feed shaft and also in the case of starting a movement from a stoppage.

It is still another object of the present invention to conduct machining with high accuracy by giving consideration to a change in the weight when a workpiece loaded on the moving body of the feed shaft or an attachment is replaced or when a workpiece is machined so that the weight of the workpiece is reduced with time.

It is still another object of the present invention to conduct machining highly efficiently with high accuracy without the occurrence of overheat of the feed shaft motor even if the feed shaft motor is continuously operated while it is frequently accelerated and decelerated.

In order to accomplish the above objects, the present invention is composed as follows. By using the execution result of the numerically controlled program data obtained from the servo control unit of the numerically controlled device, a desired torque command or an electric current command, which corresponds to a change in the frictional force of the feed mechanism of the feed shaft or corresponds to a change in a workpiece, is estimated by calculation, and the thus obtained estimation value is outputted to the feed motor drive means.

According to the present invention, there is provided a method of controlling a numerically controlled machine tool having a plurality of feed shafts of three orthogonal X-Y-, and Z-axes or at least one of rotary shafts of A-, B- and C-axes in addition to a plurality of feed shafts of three orthogonal X-, Y-, and Z-axes of X, characterized in that the method comprises the steps of:

taking numerical controlling program data from a reading and interpreting unit provided in a numerically controlling device to execute the program data in a movement command distribution controlling unit and a servo control unit;

estimating an appropriate torque or electric current command corresponding to the changes in frictional force in the feed mechanisms of the respective feed shafts or in the weight of a workpiece based on the results of execution of the numerically controlling program data outputted from the servo control unit;

outputting the estimated appropriate torque or electric current command to motor drive means of the feed shafts; and driving feed motors by the appropriate torque or electric current command corresponding to the changes in frictional force in the feed mechanisms of the respective feed shafts or in the weight of a workpiece.

According to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

taking the torque or electric current command outputted from the servo motor control unit to the feed shaft motor driving means;

estimating a desired torque or electric current command corresponding to the changes in frictional force in the feed mechanisms of the respective feed shafts or in the weight of a workpiece based on the results of execution of the numerically controlling program data outputted from the servo control unit;

outputting the estimated desired torque or electric current command to motor drive means of the feed shafts; and Estimation of the desired torque or electric current command corresponding to the changes in frictional force in the feed mechanisms or in the weight of a workpiece is an estimation of a torque or electric current command corresponding to the changes in frictional force in the feed mechanisms or in the weight of a workpiece based on the torque or electric current command and the acceleration of the feed shaft, which have been taken.

Further, according to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

detecting an inversion of the direction of movement of the feed shaft;

calculating the acceleration of the feed shaft at the time when he inversion of the direction of movement of the feed shaft is detected;

calculating the load torque based on the torque electric current command outputted from the servo control unit at the time when the inversion of the direction of movement of the feed shaft is detected to set it as the load torque before the inversion of the direction of movement of the feed shaft;

inverting the sign of value of the load torque and multiplying the load torque before the inversion of the direction of movement of the feed shaft by a predetermined constant to set the product as a target value for the load torque for the operation after the inversion of the direction of movement of the feed shaft;

calculating a load torque for the operation after the direction of movement of the feed shaft is inverted, between the time of the detection of the inversion of the direction of movement of the feed shaft and the time when the load torque reaches the target value, by using a time constant expressed as a function of acceleration at the time of the inversion of the direction of the feed shaft;

calculating a desired torque or electric current command based on the load torque after the direction of movement of the feed shaft is inverted;

outputting the desired torque or electric current command to motor drive means of the feed shafts; and moving the moving body by the feed shaft motor and the feed mechanism.

The load torque after the inversion of the direction of movement of the feed shaft may be calculated by using a time constant which is in inverse proportion to square root of the acceleration at the time when the inversion of the direction of movement of the feed shaft is detected.

The calculation of the load torque after the inversion of the direction of movement of the feed shaft can be terminated by a ratio until the set point of load torque reaches or by a distance from the feed shaft when an inversion of the direction of movement of the feed shaft is detected.

Further, according to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

setting previously a desired torque command and a speed command or a desired electric current command and a speed command, depending on the static frictional force in the feed mechanism;

calculating a torque or electric current command, based on a moving command value outputted from the movement command distribution controlling unit, in the servo control unit to output to the feed motor driving means to drive the feed motor;

detecting an inversion of the direction of movement of the feed shaft or an initiation of movement of the stationary feed shaft;

outputting, when the inversion of the direction of movement of the feed shaft or the initiation of movement of the stationary feed shaft is detected, the desired torque command and the speed command or the desired electric current command and the speed command, which are previously set, to the feed shaft motor driving means and servo control means; and moving the moving body by the feed shaft motor and feed mechanism.

Further, according to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

setting previously a desired torque command and a speed command or a desired electric current command and a speed command, depending on the static frictional force in the feed mechanism;

calculating a torque or electric current command, based on a moving command value outputted from the movement command distribution controlling unit, in the servo control unit to output to the feed motor driving means to drive the feed motor;

detecting an inversion of the direction of movement of the feed shaft or an initiation of movement of the stationary feed shaft;

calculating the acceleration of the feed shaft at the time when the inversion of the direction of movement of the feed shaft is detected;

calculating the load torque based on the torque electric current command outputted from the servo control unit at the time when the inversion of the direction of movement of the feed shaft is detected to set it as the load torque before the inversion of the direction of movement of the feed shaft;

inverting the sign of value of the toad torque and multiplying the load torque before the inversion of the direction of movement of the feed shaft by a predetermined constant to set the product as a target value for the load torque for the operation after the inversion of the direction of movement of the feed shaft;

calculating a load torque for the operation after the direction of movement of the feed shaft is inverted, between the time of the detection of the inversion of the direction of movement of the feed shaft and the time when the load torque reaches the target value, by using a time constant expressed as a function of acceleration at the time of the inversion of the direction of the feed shaft;

calculating a desired torque or electric current command based on the load torque after the direction of movement of the feed shaft is inverted;

outputting the desired torque or electric current command to motor drive means;

outputting, when the inversion of the direction of movement of the feed shaft or the initiation of movement of the stationary feed shaft is detected, the desired torque command and the speed command or the desired electric current command and the speed command, which are previously set, to the feed shaft motor driving means and servo control means; and moving the moving body by the feed shaft motor and feed mechanism.

Further, according to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

taking the torque or electric current command outputted to the feed shaft motor drive means through the servo control unit as a torque or electric current command for the moving feed shaft;

calculating a load inertia based on the torque or electric current command for the moving feed shaft and the acceleration in the feed shaft;

calculating a desired torque or electric current command corresponding to the calculated load inertia;

outputting the desired torque or electric current command to the feed motor shaft motor drive means; and moving the moving body by the feed shaft motor and the feed mechanism.

Further, according to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

detecting the weight of a workpiece or a moving body to which the workpiece is mounted;

calculating a load inertia based on the detected weight;

calculating a desired torque or electric current command based on the calculated load inertia;

outputting the desired torque or electric current command to the speed shaft motor drive means; and moving the moving body by the feed shaft motor and the feed mechanism.

Further, according to the present invention, there is provided a method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

setting and storing a time constant of acceleration and deceleration of the feed shaft and allowable temperature data for feed shaft motor;

taking the torque or electric current command outputted from the servo control unit to the feed motor driving means;

estimating the temperature of the feed shaft motor based on the taken torque or electric current command;

comparing the previously stored allowable temperature data and the estimated temperature of the feed shaft motor;

calculating an acceleration or deceleration time constant based on the comparison results;

estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means;

outputting the estimated desired torque or electric current command to the feed motor drive means; and moving the moving body by the feed shaft motor and the feed mechanism.

Further, according to the present invention, there is provided a numerically controlled machine tool having a plurality of feed shafts of three orthogonal X-, Y-, and Z-axes or at least one of rotary shafts of A-, B- and C-axes in addition to a plurality of feed shafts of three orthogonal X-, Y-, and Z-axes, characterized in that the numerically controlled machine tool comprises:

a feed mechanism for moving a moving body of each feed shaft;

a feed shaft motor for driving the feed mechanism;

a feed shaft motor drive means for driving the feed shaft motor;

a numerically controlling means for executing the numerically controlled program data to drive the feed shaft motor by a moving command distribution controlling unit and a servo control unit and for outputting the result of execution to the feed shaft motor through the feed shaft motor drive means;

a calculation controlling means for estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means when the feed shaft motor is driven to output the estimated desired torque or electric current command to the feed motor drive means.

Further, according to the present invention, there is provided a numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a feed mechanism for moving a moving body of each feed shaft;

a feed shaft motor for driving the feed mechanism;

a feed shaft motor drive means for driving the feed shaft motor;

a numerically controlling means for executing the numerically controlled program data to drive the feed shaft motor by a moving command distribution controlling unit and a servo control unit and for outputting the result of execution to the feed shaft motor through the feed shaft motor drive means;

a calculation controlling means for estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means when the feed shaft motor is driven to output the estimated desired torque or electric current command to the feed motor drive means.

Further, according to the present invention, there is provided a numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling means;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a detecting means for detecting an inversion of the direction of movement of the feed shaft;

an acceleration calculating means for calculating an acceleration when an inversion of the direction of movement of feed shaft by the detecting means; and a load torque calculating means for calculating a load torque after the inversion of the direction of movement of the feed shaft by using a time constant expressed by a function of the torque command or the electric current command outputted from the speed control means at the time when the inversion of the direction of movement of the feed shaft is detected by the detecting means and the acceleration, calculated by the acceleration calculating means, when the inversion of the direction of movement of the feed shaft is detected to output the calculated desired torque or electric current command corresponding to the load torque to the speed control means.

Further, according to the present invention, there is provided a numerically controlled machine tool including a numerically controlling device which has a reading an interpreting unit, a movement command distribution controlling unit for executing a numerical control program data, which has been drawn from the reading an interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling means;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a detecting means for detecting an inversion of the direction of movement of the feed shaft or the initiation of movement of the stationary feed shaft; and a static friction correcting means for outputting predetermined desired torque command and speed command or electric current command and speed command, to the feed shaft motor drive means and the speed control means, corresponding to the static frictional force of the feed mechanism when the inversion of the direction of movement of the feed shaft or the initiation of the movement of the feed shaft is detected by the detecting means.

Further, according to the present invention, there is provided a numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling means;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a detecting means for detecting an inversion of the direction of movement of the feed shaft or the initiation of movement of the stationary feed shaft; and an acceleration calculating means for calculating the acceleration when the detecting means detects the inversion of the direction of movement of the feed shaft;

a load torque calculating means for calculating a load torque after the inversion of the direction of movement of the feed shaft by using a time constant expressed by a function of the torque command or the electric current command outputted from the speed control means at the time when the inversion of the direction of movement of the feed shaft is detected by the detecting means and the acceleration, calculated by the acceleration calculating means, when the inversion of the direction of movement of the feed shaft is detected to output the calculated desired torque or electric current command corresponding to the load torque to the speed control means;

a static friction correcting means for outputting predetermined desired torque command and speed command or electric current command and speed command, to the feed shaft motor drive means and the speed control means, corresponding to the static frictional force of the feed mechanism when the inversion of the direction of movement of the feed shaft or the initiation of the movement of the feed shaft is detected by the detecting means.

Further, according to the present invention, there is provided a numerically controlled machine tool including a numerically controlling device which has a reading an interpreting unit, a movement command distribution controlling unit for executing a numerical control program data, which has been drawn from the reading an interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling means;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a speed feedforward control means for estimating a speed command based on the movement command of the feed shaft outputted from the movement command distribution controlling unit by calculation to output the speed command to the speed control means;

an acceleration feedforward control means for estimating an acceleration or torque command of the feed shaft outputted from the movement command distribution controlling unit by calculation to output the acceleration or torque command to the feed shaft motor drive means; and an inertia calculating means for calculating a load inertia based on the torque or electric current command, outputted to the feed shaft motor drive means from the speed control means, and the acceleration of the feed shaft to output the load inertia to the speed control means and the acceleration feed forward control means, the speed control means outputs a desired torque or electric current command based on the load inertia, calculated by the inertia calculating means, to the feed shaft motor drive means.

Further, according to the present invention, there is provided a numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling means;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a speed feedforward control means for estimating a speed command based on the movement command of the feed shaft outputted from the movement command distribution controlling unit by calculation to output the speed command to the speed control means;

an acceleration feedforward control means for estimating an acceleration or torque command of the feed shaft outputted from the movement command distribution controlling unit by calculation to output the acceleration or torque command to the feed shaft motor drive means;

a weight detecting means for detecting the weight of a workpiece or a moving body to which the workpiece is mounted; and an inertia calculating means for calculating a load inertia based on the torque or electric current command, outputted to the feed shaft motor drive means from the speed control means, and the acceleration of the feed shaft to output the load inertia to the speed control means and the acceleration feed forward control means, the speed control means outputting a desired torque or electric current command based on the load inertia, calculated by the inertia calculating means, to the feed shaft motor drive means.

Further, according to the present invention, there is provided a feed mechanism for moving a moving body of each feed shaft;

a feed shaft motor for driving the feed mechanism;

a feed shaft motor drive means for driving the feed shaft motor;

a numerically controlling means for executing the numerically controlled program data to drive the feed shaft motor by a moving command distribution controlling unit and a servo control unit and for outputting the result of execution to the feed shaft motor through the feed shaft motor drive means;

a data storage means for storing a time constant of acceleration and deceleration of the feed shaft and allowable temperature data for feed shaft motor;

a temperature calculating means for estimating, through an calculation, the temperature of the feed shaft motor based on the torque or electric current command outputted to the feed shaft motor drive means from the servo motor control means;

an acceleration deceleration time constant calculating means for setting an acceleration deceleration time constant based on a comparison between the allowable temperature data previously stored in the data storage means and the temperature of the feed shaft motor estimated by the temperature calculating means to output the resultant time constant to the movement command distribution controlling unit; and a calculation controlling means for estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means when the feed shaft motor is driven to output the estimated desired torque or electric current command to the feed motor drive means.

In the numerically controlled machine tool of the present invention, according to the movement command outputted from the movement command distributing control unit, it is possible to conduct the detection of start of movement from stoppage, calculation of acceleration by the second order differentiation, feedforward control of speed, and feedforward control of acceleration. Therefore, before the feed shaft motor is driven, control can be conducted by the calculation controlling means. Accordingly, even if the feed speed is high, machining can be conducted with high accuracy.

According to the present invention, the temperature of the feed shaft motor is estimated by calculation and compared with the predetermined temperature data allowed to the feed shaft motor, and the time constant of acceleration and deceleration of the feed shaft is changed according to the result of comparison. Further, the desired torque command or electric current command corresponding to changes in the frictional force of the feed shaft and the weight of a workpiece is outputted into the feed shaft motor drive means. In the present invention, the above control can be conducted being combined.

As described above, according to the present invention, it is possible to provide a method of controlling a numerically controlled machine tool by which machining can be conducted with high accuracy even when a moving body of the machine tool is moved at high speed, also it is possible to provide a numerically controlled machine tool by which machining can be conducted with high accuracy even when a moving body of the machine tool is moved at high speed. Even if the quadrant of a feed shaft is changed over while profile machining or curved face machining is being conducted by moving a plurality of feed shafts simultaneously, or even if the weight of a workpiece given to the feed shaft is changed, machining accuracy can be kept high.

Even if a change is caused in the dynamic and static frictional force of the feed mechanism at the inversion of movement of the feed shaft and at the start of movement from stoppage, it is possible to conduct machining with high accuracy. When a workpiece mounted on the moving body of the feed shaft is replaced or an attachment used for attaching the workpiece is replaced and also when the weight of a workpiece is reduced with time while it is being machined, a desired torque command or electric command is outputted into the feed shaft motor drive means while it follows a change in inertia caused by the change in the weight. Therefore, the machining accuracy can be kept high. Further, even when the feed shaft motor is continuously operated being frequently accelerated and decelerated, there is no possibility of overheat of the feed shaft motor. Accordingly, machining can be conducted with high accuracy.

The present invention is compared with the aforementioned five prior arts as follows. According to the first prior art, various accelerations caused by lost motions are added to the speed command of the servo control unit, and the feed shaft motor is driven via the speed control unit after that. On the other hand, according to the present invention, the desired torque command or electric current command is estimated by calculation, and the result of estimation is directly outputted into the feed motor shaft drive means. Therefore, the feed shaft motor can be driven without causing any delay. According to the second prior art, there still exists a delay in servo system of the positional feedback controlling means and the speed feedback controlling means. However, according to the present invention, the above delay is not caused. According to the third prior art, acceleration of the feed shaft is controlled so that it can be lowered. On the other hand, according to the present invention, acceleration of the feed shaft is kept at an appropriate predetermined value, and a desired torque command or electric current command is outputted into the feed shaft motor drive means when a value of inertia is changed. Therefore, the machining efficiency is not be deteriorated. According to the fourth prior art, the torque observer detects a change in the load torque estimated by the speed command, and the load inertia is estimated. On the other hand, according to the present invention, load inertia is calculated by using the torque command or electric current command actually outputted into the feed shaft motor drive means. Therefore, more actual load inertia can be found, and an accurate torque command can be outputted into the feed shaft motor drive means. The fifth prior art relates to a technique for preventing the feed shaft motor from overheating. On the other hand, according to the present invention, a desired torque command or electric current command corresponding to changes in the frictional force of the feed mechanism and the weight of a workpiece is outputted into the feed shaft motor drive means. Therefore, machining can be conducted with high accuracy.

BRIEF DESCRIPTION OF THE DRAWINGS

FIG. 9A is a flow chart showing a method of calculating the load inertia.

THE MOST PREFERRED EMBODIMENT

Figure 1:
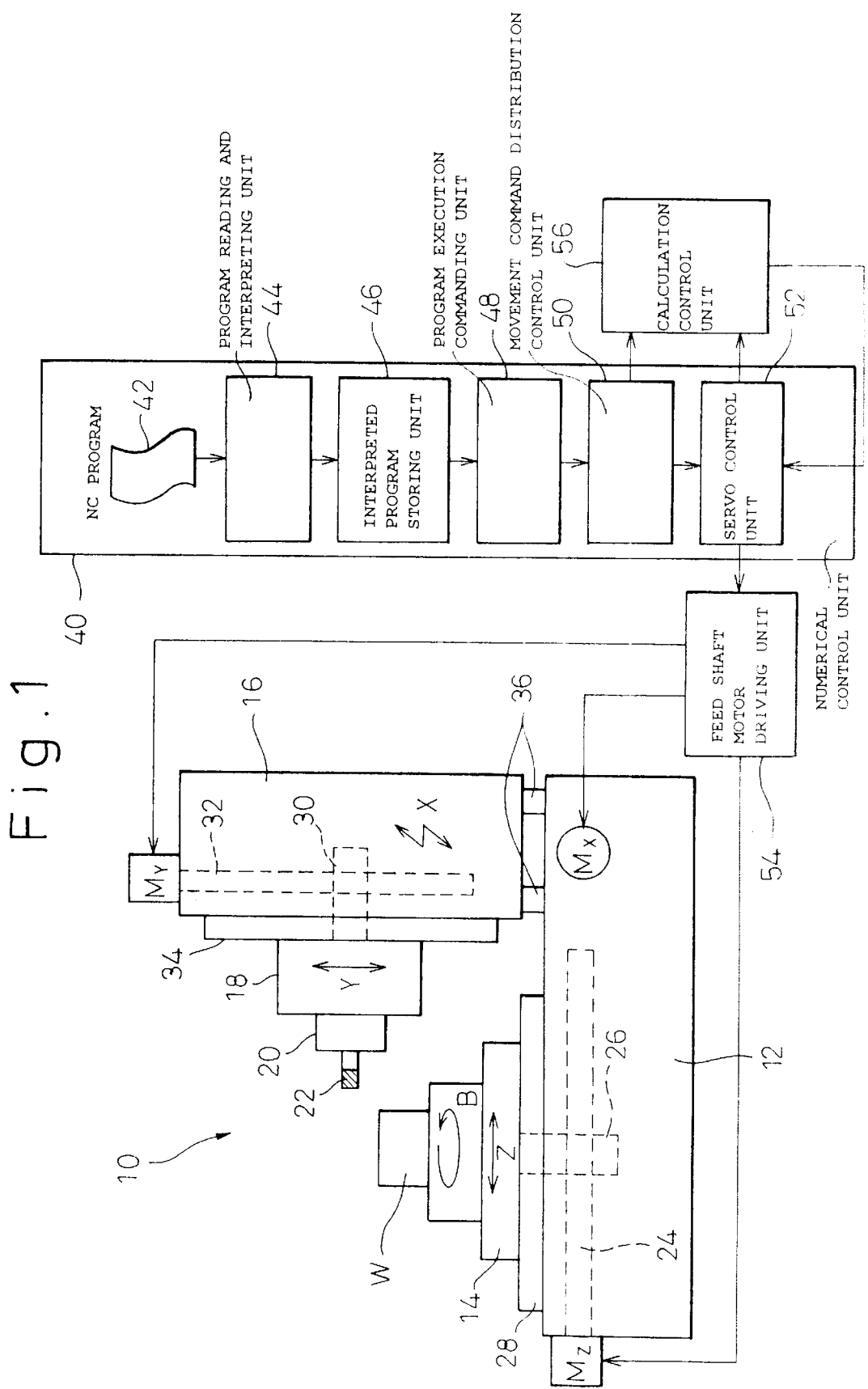
FIG. 1 is an overall arrangement view of the numerically controlled machine tool of the present invention.

Referring to FIG. 1, the numerically controlled machine tool of the present invention will be explained below.

As shown in FIG. 1, the numerically controlled machine tool 10 is a horizontal type machining center and provided with the bed 12 which is set on the floor of a factory. On the upper face of the bed 12, there is provided a Z-axis guide rail 28 in the horizontal direction of Z-axis. In FIG. 1 the horizontal direction of Z-axis is a traverse direction. The table 14, to which a workpiece W is fixed, is slidably attached to the Z-axis guide rail 28. FIG. 1 shows an example in which NC rotary table capable of rotating round B-axis is fixed onto the table 14 and the workpiece W is mounted on the NC rotary table. However, it is possible to directly mount the workpiece W on the table 14 without arranging the NC rotary table. On the upper face of the bed 12, X-axis guide rail 36 is arranged in a horizontal direction perpendicular to Z-axis, that is, X-axis guide rail 36 is arranged in a direction perpendicular to the surface of FIG. 1. The column 16 is slidably attached to the X-axis guide rail 36. In the column 16, Y-axis guide rail 34 is arranged in the direction of Y-axis which is perpendicular to both X-axis and Z-axis, that is, Y-axis guide rail 34 is arranged in the direction of the upper and lower sides of FIG. 1. The spindle head 18 for pivotally supporting the main spindle 20 is slidably attached to the Y-axis guide rail 34.

On the lower side of the table 14 in the bed 12, Z-axis feed screw 24 is arranged in the direction of Z-axis which is used as a Z-axis feed shaft. The nut 26 screwed to the Z-axis feed screw 24 is fixed to the lower face of the table 14. Z-axis feed servo motor $M_Z$ is connected with one end of the Z-axis feed screw 24. When servo motor $M_Z$ is driven so as to rotate the Z-axis feed screw 24, the table 14 is moved along the Z-axis guide rail 28. In the same manner, on the lower side of the column 16 in the bed 12, Z-axis feed screw (not shown), which is an X-axis feed shaft, is arranged in the direction of X-axis. On the lower face of the column 16, a nut (not shown) screwed to the X-axis feed screw is fixed. X-axis feed servo motor $M_X$ is connected with one end of the X-axis feed screw. When X-axis feed servo motor $M_X$ is driven and the X-axis feed screw is rotated, the column 16 is moved along the X-axis guide rail 36. Further, Y-axis feed screw 32, which is a Y-axis feed shaft, is arranged in the column 16 in the direction of Y-axis. On the back of the spindle head 18, the nut 30 screwed to the Y-axis feed screw 32 is fixed. Y-axis feed servo motor $M_Y$ is connected with an upper end of the Y-axis feed screw 32. When the Y-axis feed servo motor $M_Y$ is driven and the Y-axis feed screw 32 is rotated, the spindle head 18 is moved along the Y-axis guide rail 34.

A tool 22, for example, an end mill is attached to the forward end of the main spindle 20. While the tool 22 is being rotated, the column 16, spindle head 18 and table 14 are relatively moved in the directions of X, Y and Z axis. Due to the foregoing, the workpiece W fixed to the table 14 can be machined into a predetermined shape. When NC rotary table is fixed to the machine, the numerically controlled machine tool 10 can be said to be a four-axis type numerically controlled machine tool having B-axis.

The numerically controlled machine tool 10 includes a numerically control unit 40 for controlling servo motors $M_X$, $M_Y$ and $M_Z$ for feeding in the three axis directions of X, Y and Z axis of the column 16, spindle head 18 and table 14. Of course, in the case where NC rotary table is fixed to the machine, B-axis feed servo motor $M_B$ (not shown) is provided. The numerically control unit 40 includes: a program reading and interpreting unit 44 for reading and interpreting NC program 42; an interpreted program storing unit 46 for temporarily storing an interpreted program; a program execution commanding unit 48 for appropriately drawing a program from the interpreted program storing unit 46 and outputting execution program data; a movement command distributing control unit 50 for outputting a movement command of each direction of X, Y and Z axis according to the execution program data from the program execution commanding unit 48; and a servo control unit 52 for outputting a torque command or electric current command to the feed shaft motor driving unit 54 according to the movement command from the movement command distributing control unit 50 and also according to the feedback signal described later. The feed shaft motor driving unit 54 outputs an electric current according to the torque command or electric current command sent from the servo control unit 52 so as to drive feed shaft motors $M_X$, $M_Y$ and $M_Z$ of X, Y and Z axis. Further, in this embodiment, there is provided a calculation control unit 56 for correcting a torque command or electric current command sent from the servo control unit 52 to the feed shaft motor driving unit 54.

Next, referring to FIG. 2, a preferred embodiment including the servo control unit 52 and the calculation control unit 56 will be explained below. In the embodiment shown in FIG. 2, the calculation control unit 56 is provided with the load torque calculating unit 70 by which backlash acceleration correction is conducted. Like reference characters are used to indicate like parts in FIGS. 1 and 2. In the following descriptions, only the feed control of Z-axis on the table 14 is explained, however, it should be understood that likewise the feed control of X-axis and Y-axis can be executed.

The servo control unit 52 includes: a subtracter 58 for comparing the movement command sent from the movement command distribution control unit 50 with the position feedback signal sent from position detector SP such as a digital liner scale attached to the table 14; a position control unit 60 for amplifying an output from the subtracter 58; a subtracter 62 for comparing the output value of the position control unit 60 with the speed feedback signal from pulse coder PC attached to feed shaft motor $M_Z$; and a speed control unit 64 for amplifying an output of the subtracter 62.

On the other hand, the movement command outputted from the movement command distribution control unit 50 is sent to both the detecting unit 66 and the acceleration calculating unit 68 every second. The detecting unit 66 analyzes a movement command sent from the movement command distributing control unit 50 and monitors a change in the direction of movement of the table 14. When the direction of movement of the table 14 is inverted, the direction of movement inverting signal is output to the acceleration calculating unit 68 and to the load torque calculating unit 70 which provides an example of the calculating control unit 56.

The load torque calculating unit 70 includes a time constant calculating unit 72, load torque correction calculating unit 74, and load torque detecting unit 76 as essential components. The acceleration calculating unit 68 conducts the second order differentiation on the moving command so as to find an acceleration of the moving body, and the thus found acceleration is sent to the time constant calculating unit 72. The time constant calculating unit 72 calculates a time constant according to the acceleration sent from the acceleration calculating unit 68. On the other hand, the load torque detecting unit 76 receives a direction of movement inverting signal sent from the detecting unit 66 and a torque command or electric current command which is an output of the speed control unit 64 of the servo control unit 52 to output a torque command or electric current command immediately before the inversion of the direction of movement of the table 14 to the load torque correction calculating unit 74. In this case, it is possible to receive an actual electric current outputted to feed shaft motor $M_Z$ from the feed shaft motor driving unit 54 according to the torque command or electric current command outputted from the speed control unit 64 to provide a torque command or electric current command immediately before the inversion in the direction of movement of the table 14 to the load torque correction calculating unit 74. The load torque correction calculating unit 74 calculates a load torque correction value according to the time constant, which is a result of the calculation conducted by the time constant calculating unit 72, and also according to the torque command or electric current command immediately before the inversion in the direction of movement which is sent from the load torque detecting unit 76. Then, the thus calculated load torque correction value is sent to the speed control unit 64. The inversion in the direction of movement and the calculation of the acceleration may not be found from the movement command, but they may be found by taking in the output signal outputted from the position control unit 60. Also, they may be found by using the acceleration sensor attached to the moving body.

Figure 7:
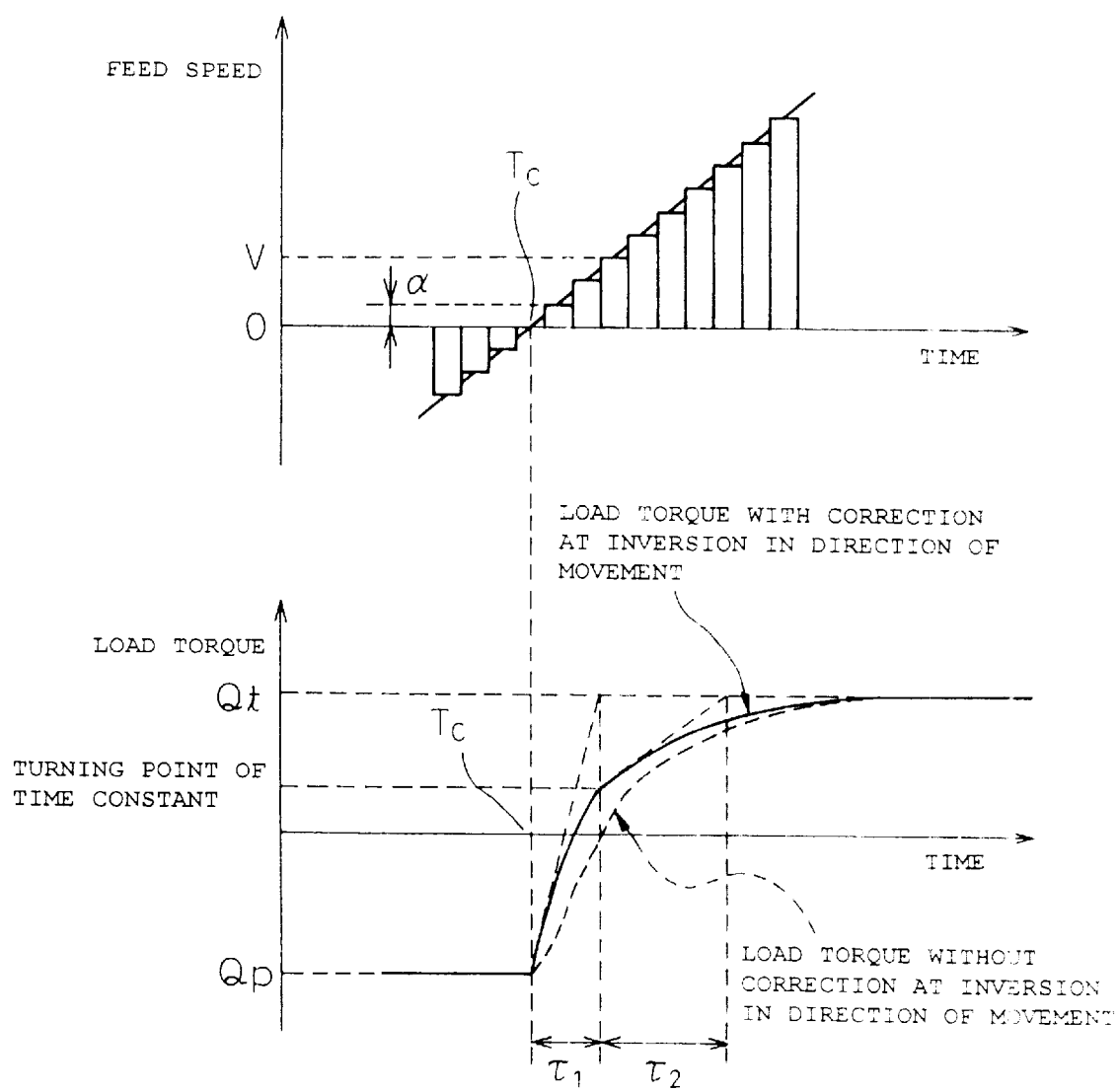
FIG. 7 is a view for explaining an inversion of the direction of the feed shaft, wherein an upper portion of FIG. 7 is a graph showing a change in the feed speed with respect to the time, and a lower portion of FIG. 7 is a graph showing a change in the load torque with respect to the time.

Referring to FIG. 7, there is shown a state in which feed control is conducted under the condition that the acceleration is constant. The graph drawn in the upper portion FIG. 7 shows a change in the feed speed with respect to the time, and the graph drawn in the lower portion FIG. 7 shows a change in the load torque correspondingly impressed upon the feed shaft with respect to the time. In FIG. 7, the change in speed with respect to the time is expressed in such a manner that changes in speed difference $\Delta V$ with respect to predetermined time difference $\Delta T$ are connected with each other by straight lines.

In the graph shown in FIG. 7, the moment at which feed speed V is changed from negative to positive (At this moment, the feed speed is zero.) is indicated by mark Tc. At this time, the load torque changes as follows. The load torque changes from load torque Qp, which is a torque before Tc, to target load torque Qt. In the example shown in FIG. 7, under the condition that the acceleration is constant, the absolute value of previous load torque Qp, which is a torque before TC, is the same as the absolute value of target load torque Qt, and the sign (+, −) of previous load torque Qp is opposite to the sign (+, −) of target load torque Qt.

The above inversion of the direction of drive of the servo motor is caused, for example, at a turning point of the movement path of the tool 22 from one quadrant to the other when the numerically controlled machine tool 10 conducts cutting process along an arc. At this point, due to the backlash and friction of the feed screw, the machine tool can not instantly invert so that a delay is caused generally in the motion of the machine tool. Therefore, the load torque is gradually changed from previous load torque Qp to target load torque Qt, as shown by a broken line in the graph. As a result, a protrusion is produced in the machined face of a workpiece.

The inventors made various experiments and found the following conditions which allows no protrusion or recess to be produced in the machined face of a workpiece when the direction of movement of the moving body is inverted. There is a certain correlation between the load torque correction and the acceleration of the moving body. In particular, if the time constant of the load torque correction is a value which is in inverse proportion to square root of the acceleration, the occurrence of the above defects in the machined face can be prevented.

According to the above knowledge, the load torque correction is found as follows, in this embodiment. First, a change in the direction of movement of the table 14 is monitored by the detecting unit 66. When the direction of movement of the table 14 is inverted, a direction of movement inversion signal is outputted from the detecting unit 66 to the acceleration calculating unit 68 and the load torque calculating unit 70. The acceleration calculating unit 68 sends an acceleration of the moving body to the time constant calculating unit 72 when the acceleration calculating unit 68 receives the direction of movement inversion signal. The time constant calculating unit 72 calculates the time constant by the following formula based on the acceleration from the acceleration calculating unit 68, and the thus the obtained time constant is sent to the load torque correction calculating unit 74.

$$\tau = k\alpha^{-\frac{1}{2}}$$

In the above formula, $\tau$ is time constant, $\alpha$ is acceleration, and k is a coefficient for the time constant.

At this time, the load torque detecting unit 76 sends the output value of the speed control unit 64, at the direction of movement inversion signal being received, as a load torque before the inversion of the direction of movement, to the load torque correction calculating unit 74. The load torque correction calculating unit 74 sets the load torque Qp before the inversion in the direction of movement from the load torque detecting unit 76 as a load torque reference value Qs. Next, the load torque correction calculating unit 74 inverts the sign of the load torque Qp before the inversion in the direction of movement (that is, +−are changed from each other), and thus obtained value is multiplied by a predetermined constant to provide a load torque target value Qt on the feed shaft after the inversion in the direction of movement. Next, according to the following formula, the load torque correction calculating unit 74 finds load torque correction ΔQ to be added to the load torque generated by the speed control unit 64 based on the movement command and the feedback signal.

$$\Delta Q = a \times Qs \times \frac{1}{\tau}$$
$$= a \times Qs \times \frac{1}{k} a^{\frac{1}{2}}$$

Where, the constant "a" is a constant which may be found by experiments. For example, "a" is related to the acceleration of the moving body obtained by the acceleration calculating unit 68, and stored and accommodated as a data table so that it can be appropriately called out and used based on acceleration $\alpha$.

As described above, correction ΔQ is calculated by time constant $\tau$ which is expressed by a function of acceleration $\alpha$ in the case of an inversion in the direction of movement. Based on the correction ΔQ, an increment for the load torque Q, at an inversion in the direction of movement, up to the target load torque Qt which has been set when the inversion in the direction of movement of the table 14 is detected. Based on the load torque Q, the speed control unit 64 calculates a desired torque command or electric current command corresponding to the load torque Q after the inversion in the direction of movement. The torque command or electric current command thus obtained is outputted to the feed shaft motor driving unit 54, and feed shaft motor $M_Z$ is driven to move the table 14.

Figure 2:
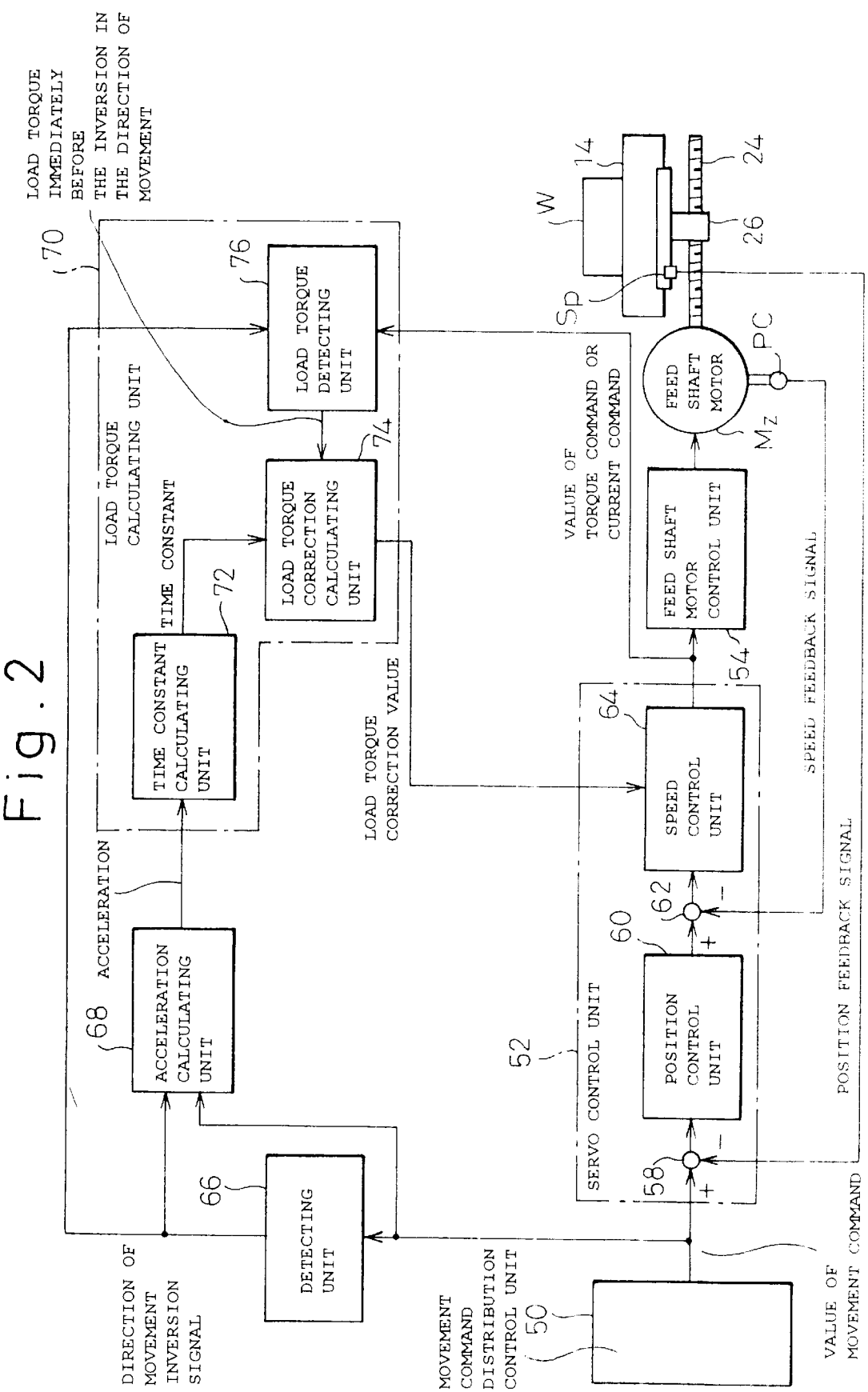
FIG. 2 is a block diagram showing a structure of the first embodiment of the control unit for controlling the numerically controlled machine tool of the present invention.

In the embodiment shown in FIG. 2, the time constant is found as a value which is in inverse proportion to the square root of the acceleration. The above method gives an excellent result when the table 14, column 16 and spindle head 18, which provide the moving body, are relatively light. However, when the table 14, column 16 and spindle head 18, which provide the moving body, are relatively heavy, or when the static friction is high, time constant obtained by ⅓ or ⅗ power of the acceleration instead of the square may provide results better. The calculation of correction ΔQ for the load torque may be terminated based on the increment for the load torque up to the target Qt or on the distance from the position of the feed shaft at the inversion in the direction of movement.

In case that coefficient of static friction is high, two time constants $\tau 1$ and $\tau 2$, one is larger than the other, may be used so that when the direction of movement is inverted, the smaller time constant $\tau 1$ is selected, and then the larger time constant $\tau 2$ is selected. This allows high load torque to be impressed on the shaft feed servo motors $M_X$, $M_Y$ and $M_Z$ immediately after the inversion in the direction of movement, so that the delay of the servo control is reduced, as shown by the solid line on the graph on the lower side of FIG. 7.

Figure 3:
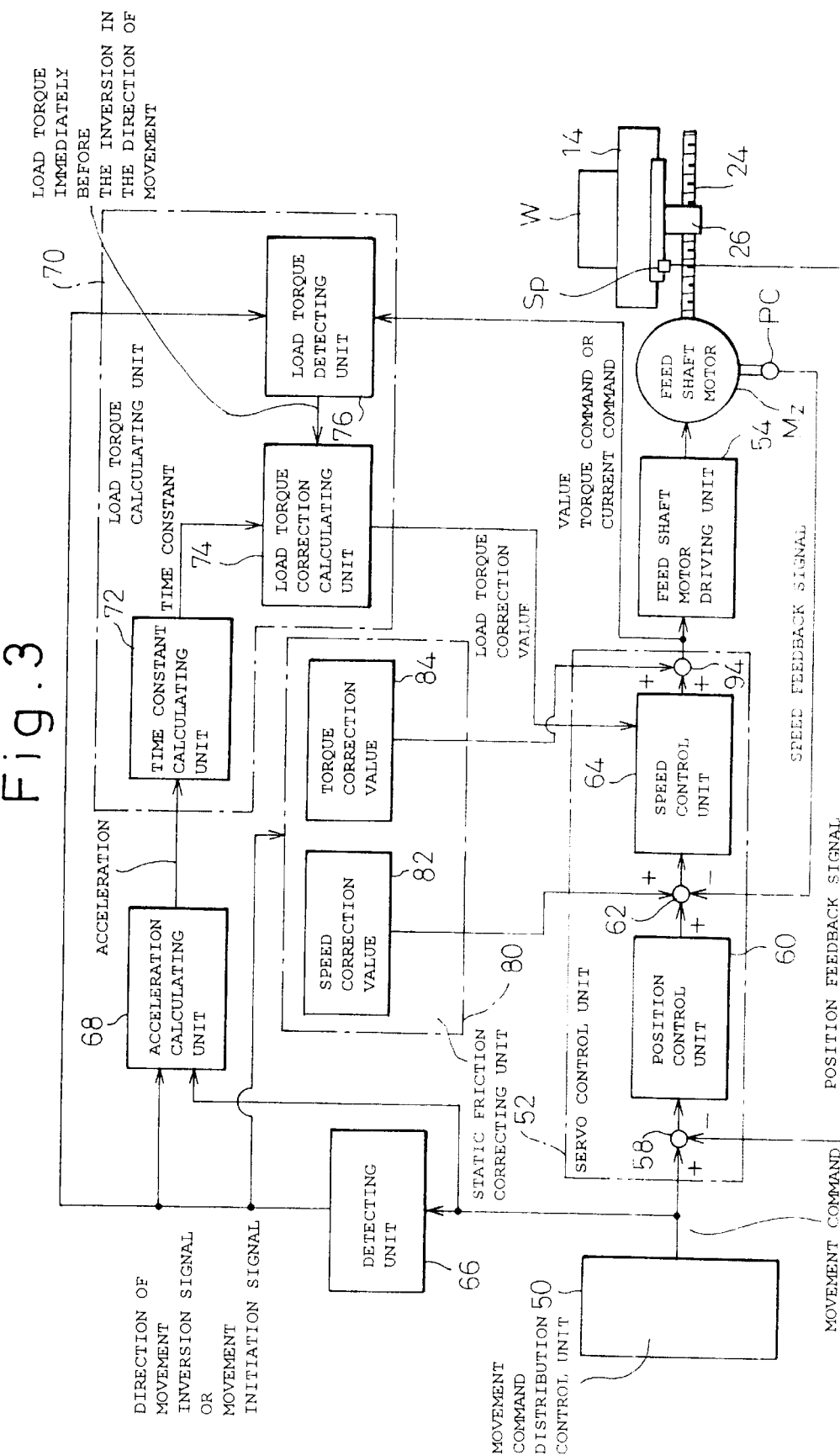
FIG. 3 is a block diagram showing a structure of the second embodiment of the control unit for controlling the numerically controlled machine tool of the present invention.

In case that the coefficient of static friction is high, a static friction correcting unit 80 may be added to the embodiment of FIG. 2 as shown in FIG. 3. That is, a desired torque command, electric current command or speed command corresponding to the static friction of the feed mechanism is previously set, and a torque command or electric current command sent to the feed shaft motor driving unit 54 can be determined based on the preset desired torque command, electric current command or speed command. Incidentally, like reference numbers are used to indicate like parts in FIGS. 1, 2 and 3.

In the embodiment shown in FIG. 3, the static friction correcting unit 80 is provided between the detecting unit 66 and the servo control unit 52. The static friction correcting unit 80 outputs the speed correction 82, which is a desired speed command, and the torque correction 84, which is a desired torque command, respectively to the subtracter 62 and the subtracter 94 arranged in the downstream of the speed control unit 64. Static friction causes a problem when including the table 14, column 16 and spindle shaft 18, which provide the moving body, start moving from stationary state, and also the static friction causes a problem when the direction of movement of the moving body is inverted. Therefore, in the embodiment shown in FIG. 3, according to the movement command sent from the movement command distribution control unit 50, the detecting unit 66 sends out not only the direction of movement inversion signal of the moving body but also the movement initiation signal, which indicates that the moving body has started moving from stationary state, to the load torque calculating unit 70 and static friction correcting unit 80. The load torque calculating unit 70 acts substantially the same as the embodiment shown in FIG. 2.

When the static friction correcting unit 80 receives a direction of movement inversion signal or movement initiation signal from the detecting unit 66, a predetermined speed command is sent to the subtracter 62, that is, a speed command in the shape of inverted "V" or triangle, in which the speed increases linearly and then decreases linearly with respect to the time, is sent to the subtracter 62. At the same time, the static friction correcting unit 80 outputs a predetermined torque command composed of rectangular waves to the subtracter 94 arranged in the downstream of the speed control unit 64 to control the acceleration of feed shaft motor $M_Z$.

According to the prior art, with the load inertia assumed to be constant, and a value, which is obtained by multiplying the load inertia by the acceleration at every moment, is outputted to the feed shaft motor driving unit 54 as a torque command. However, the load inertia changes with the weight of a workpiece fixed to the table 14 and also changes with the progression of machining of the workpiece. Therefore, if the torque command is kept constant, it is impossible to improve the machining accuracy.

Figure 4:
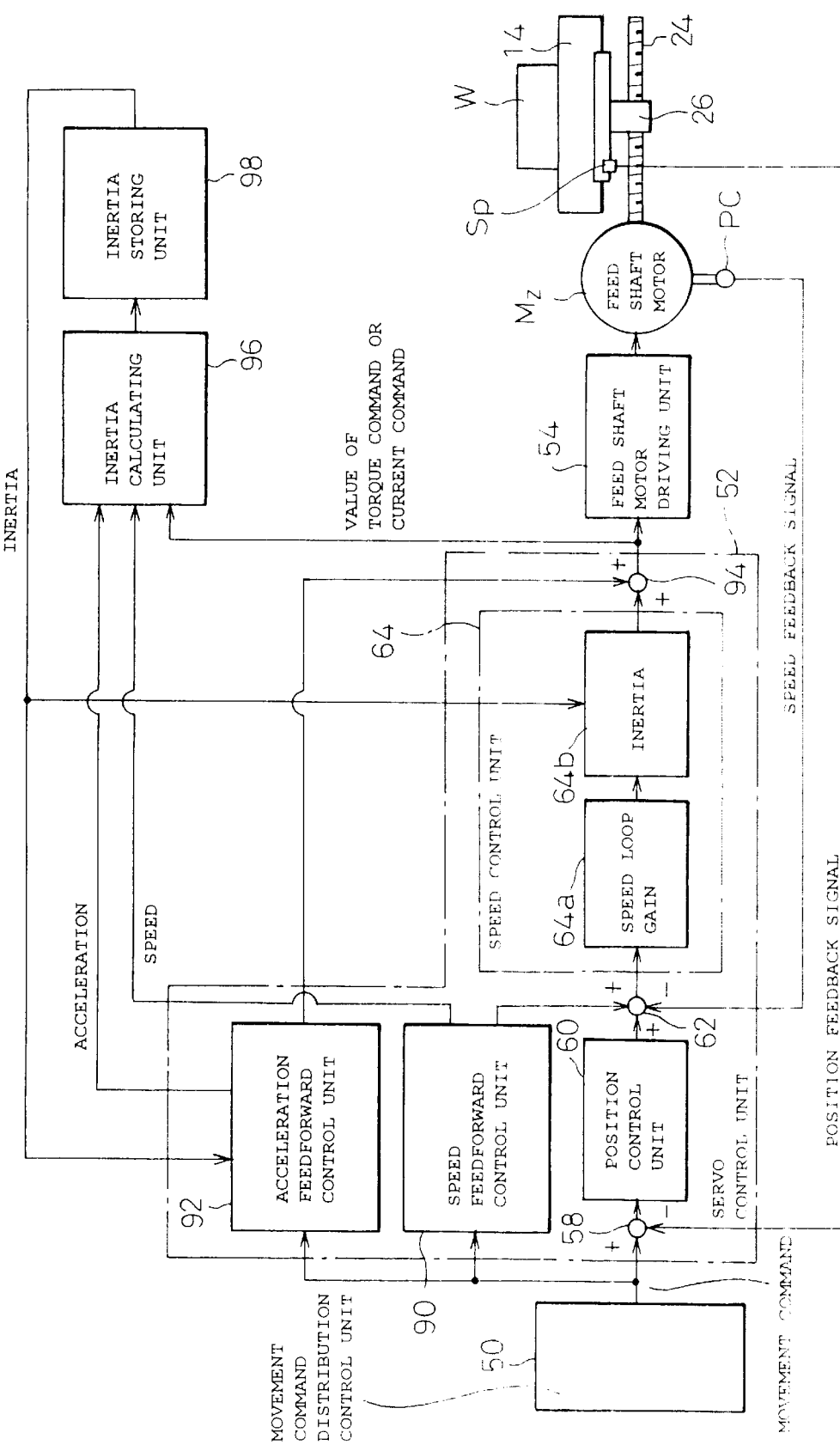
FIG. 4 is a block diagram showing a structure of the third embodiment of the control unit for controlling the numerically controlled machine tool of the present invention.

Therefore, in the embodiment shown in FIG. 4, the change in the load inertia is calculated to determine the torque command or electric current command given to the feed shaft motor driving unit 54, based on the calculated load inertia. Incidentally, like reference numbers are used to indicate like parts in FIGS. 2, 3 and 4.

The embodiment shown in FIG. 4 includes an inertia calculating unit 96 and an inertia storing unit 98 which provides to the calculation control unit 56 shown in FIG. 1. In the embodiment shown in FIG. 4, the servo control unit 52 includes not only a position control unit 60 and speed control unit 64 but also speed feedforward control unit 90 and acceleration feedforward control unit 92. The speed feedforward control unit 90 and acceleration feedforward control unit 92 generate a speed feedforward value and acceleration feedforward value based on the position command sent from the movement command distribution control unit 50.

The speed feedforward control unit 90 conducts the first order differentiation on the movement command sent from the movement command distribution control unit 50 to calculate a speed. The speed thus calculated is outputted to the inertia calculating unit 96 and the subtracter 62 arranged in the downstream of the position control unit 60 as a speed feedforward value. The acceleration feedforward control unit 92 operates as follows. The acceleration feedforward control unit 92 calculates an acceleration by conducting the second order differentiation on the movement command sent from the movement command distribution control unit 50. The thus calculated acceleration is outputted to the inertia control unit 96, and at the same time, the calculated acceleration is multiplied by the value of inertia so as to calculate the acceleration feedforward value. The acceleration feedforward value thus calculated is outputted to the subtracter 94 arranged in the downstream of the speed control unit 64.

In the subtracter 62, a difference between the speed feedforward value, the output from the position control unit 60 and the speed feedback signal sent from the pulse coder PC is inputted into the speed control unit 64. In the speed control unit 64, the difference is successively multiplied by the gain 64a and inertia 64b, so that the load torque is outputted. The acceleration feedforward value from the acceleration feedforward control unit 92 is added to the load torque to obtain the torque command, and the torque command thus obtained is outputted to the feed shaft motor driving unit 54.

The inertia calculating unit 96 calculates the load inertia as follows based on the speed from the speed feedforward control unit 90, the acceleration from the acceleration feedforward control unit 92 and the torque command or electric current command inputted to the feed shaft motor driving unit 54.

Figure 8:
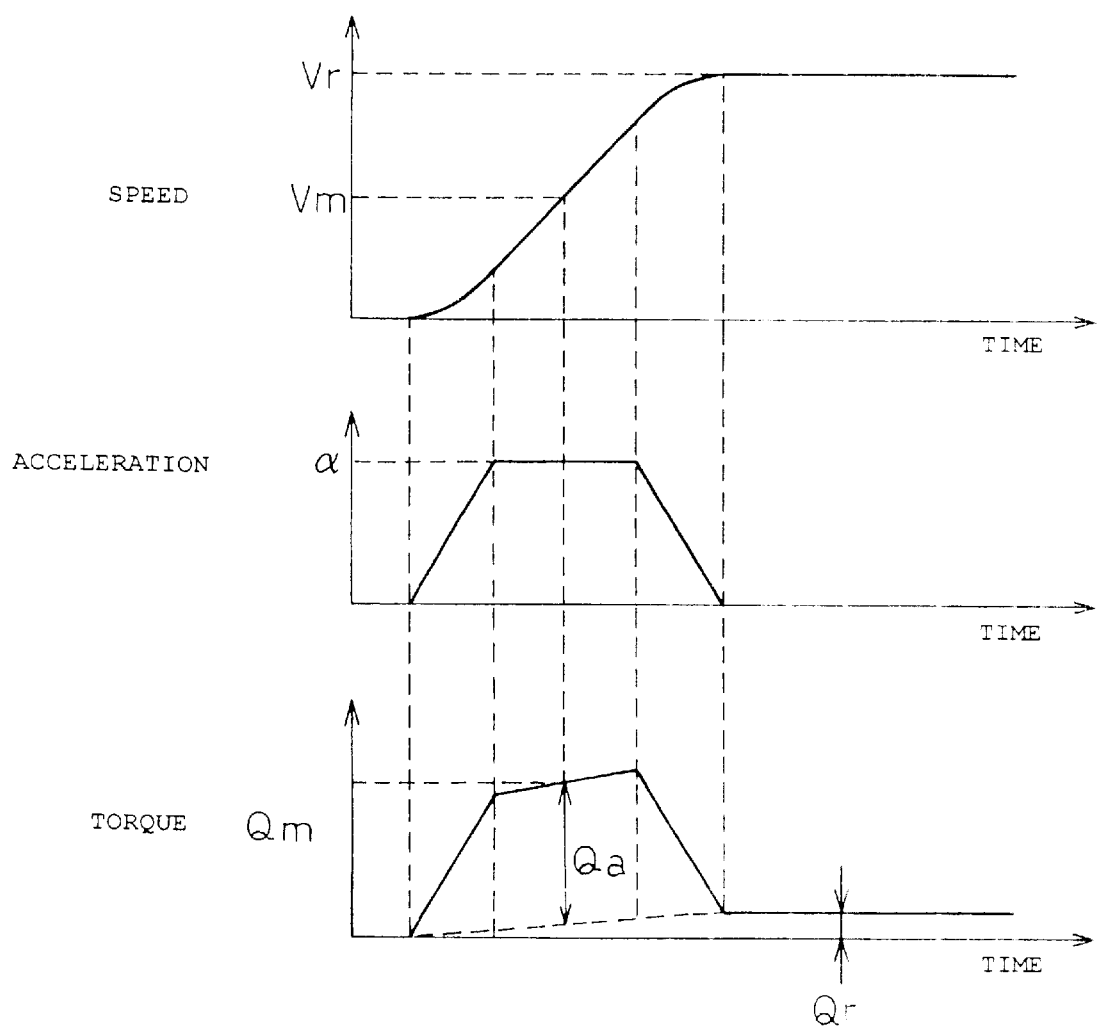
FIG. 8 is a view for explaining a method of calculating the load inertia, wherein an upper portion of FIG. 8 is a graph showing a change in the feed speed with respect to the time, a middle portion of FIG. 8 is a graph showing a change in the acceleration with respect to the time, and a lower portion of FIG. 8 is a graph showing a change in the load torque with respect to the time.
Figure 9B:
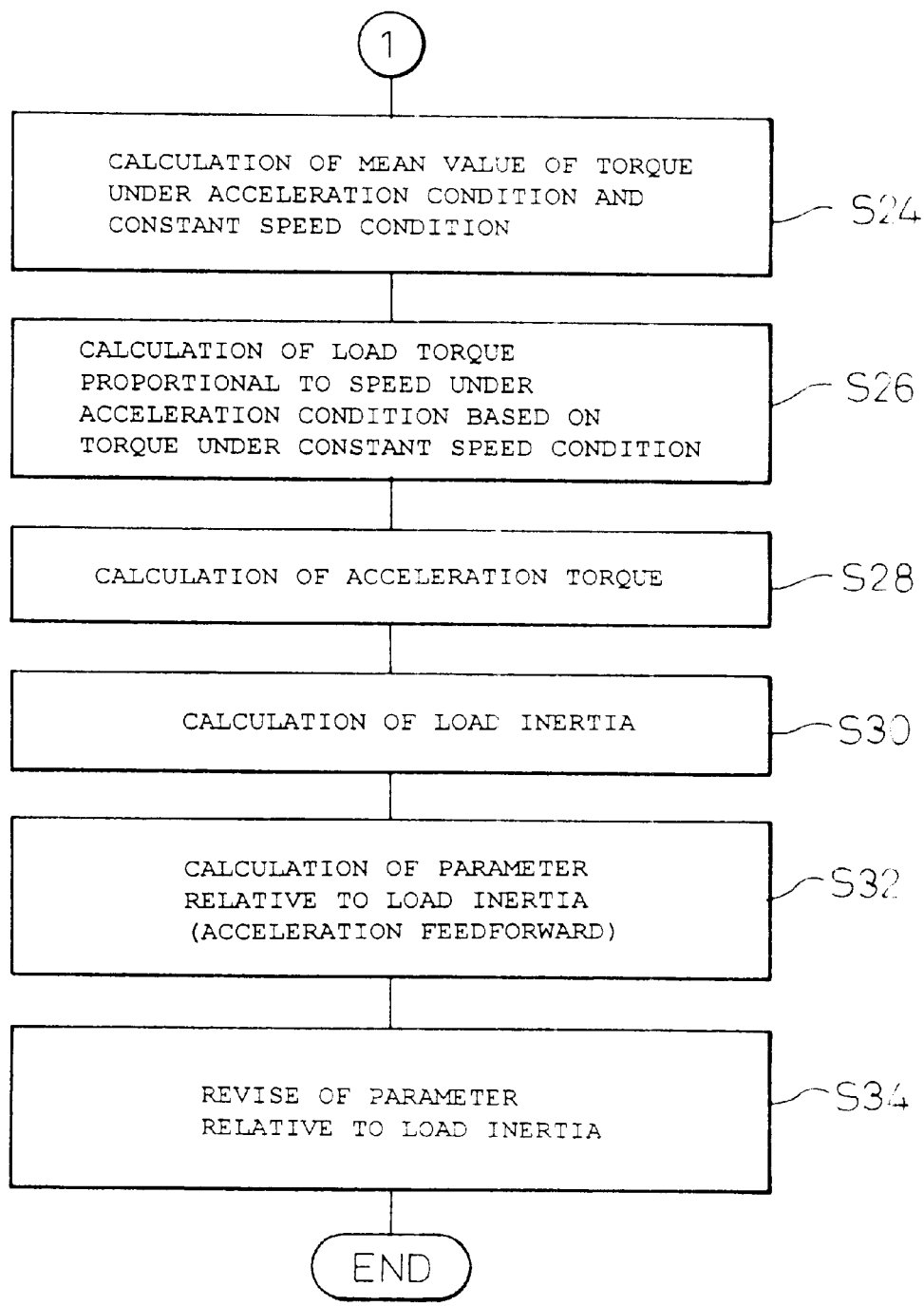
FIG. 9B is a flow chart showing a method of calculating the load inertia.

Referring to FIG. 8, changes in speed, acceleration and torque are shown as functions with respect to the time in case that the moving body is accelerated from stationary state to predetermined speed V1 by a constant acceleration and the moving body is rapidly traversed at speed V1. Referring to the flow charts shown in FIGS. 9A and 9B, the operation of the present embodiment will be explained below on the assumption that the speed, acceleration and torque are changed as shown in FIG. 8.

First, after a rapid traverse signal is received, step S10 determines, by the speed sent from the speed feedforward control unit 90 and the acceleration sent from the acceleration feedforward control unit 92, whether the shaft feed is rapid traverse condition or not. If the shaft feed is not rapid traverse condition, that is, when the result is "No" in step S10, the flow chart waits for rapid traverse condition. If the shaft feed is rapid traverse condition, that is, when the result is "Yes" in step S10, step S12 determines, by the change in the acceleration sent from the acceleration feedforward control unit 92, whether the shaft feed is accelerated under the condition of a constant acceleration or not. If the shaft is fed at a constant acceleration, that is, when the result is "Yes" in step S12, in step S14, the torque of the shaft, which is being accelerated, is subjected to sampling through the torque command or electric current command sent to the feed shaft motor drive unit 54. When the sampling is conducted by the predetermined number N, the above sampling is completed, that is, when the result is "Yes" in step S16, the above sampling is completed. When the number of times of sampling is smaller than N, that is, when the result is "No" in step S16, the program returns to step S10, and the sampling of torque is conducted again.

In the case where the shaft is not fed at a constant acceleration, that is, when the result is "No" in step S12, step S18 determines, by the change in the speed sent from the speed feedforward control unit 90, whether the shaft is fed at a constant speed or not. When the shaft is fed at a constant speed, that is, when the result is "Yes" in step S18, in step S20, sampling is conducted to the torque, while the shaft is fed at a constant speed, through the torque command or electric current command sent to the feed shaft motor driving unit 54. When this sampling is conducted by the predetermined number M, the above sampling is completed, that is, when the result is "Yes" in step S22, the above sampling is completed. When the number of sampling is smaller than M, that is, the result is "No" in step S22, the program returns to step S10, and the sampling of torque is conducted again.

When the torque sampling is completed under the condition that the acceleration is constant or the speed is constant, average Q1 of torque under the acceleration condition and average Qr of torque under the constant speed condition are calculated in step S24. Next, in steps S26 and S28, friction torque Qf, which is proportional to the speed under the acceleration condition, and acceleration torque Qa are calculated by the torque under the constant speed condition with the following equation.

$$Qf = Qr \times (Vm/Vr)$$

$$Qa = Qm - Qf = Qm - Qr \times (Vm/Vr)$$

where

Vr: constant shaft feed speed under a rapid traverse

Vm: average shaft feed speed under a constant acceleration $\alpha$ $\alpha$: constant acceleration under the acceleration condition Qm: average torque under an acceleration $\alpha$ Qr: average torque at a constant speed under a rapid traverse condition Qa: acceleration torque Next, in step S30, load inertia J is calculated with the following equation.

$$J = Qa/\alpha - JM$$

Where, J is load inertia, and JM is motor inertia.

Next, in step S32, the inertia calculating unit 96 calculates an acceleration feedforward value relative to this load inertia J, and revise the acceleration feedforward value which has been sent to and stored in the inertia storing unit 98 (step S34).

The inertia value thus calculated is outputted to the speed control unit 64 so that the latest inertia value is used when the torque command or the electric current command is calculated. At the same time, the calculated inertia value is outputted also to the acceleration feedforward control unit 92 so that the latest inertia value is used when the acceleration feedforward value to be outputted to the adder 94 is calculated. The load inertia J may be calculated based on in the torque command or the electric current command given to the feed shaft motor driving unit 54.

Figure 5:
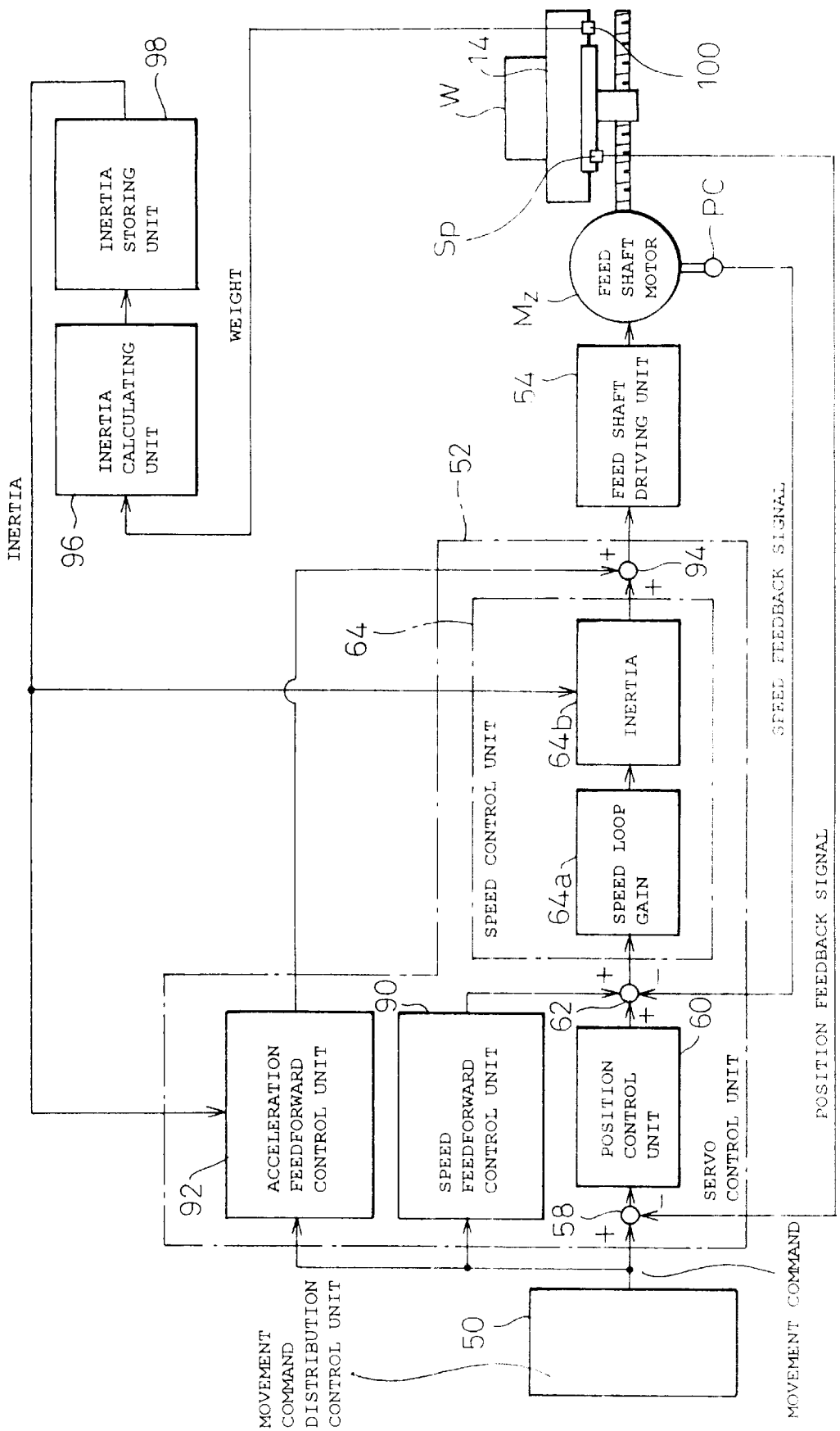
FIG. 5 is a block diagram showing a structure of the fourth embodiment of the control unit for controlling the numerically controlled machine tool of the present invention.

In the embodiment shown in FIG. 4, in order to calculate load inertia J, the speed and acceleration outputted by the speed feedforward control unit 90 and the acceleration feedforward control unit 92 are used. However, it should be noted that the present invention is not limited to the above specific embodiment. For example, as shown in FIG. 5, load inertia J may be calculated in such a manner that a change in the weight of the workpiece W is directly measured with the weight detector 100 such as a strain gauge attached to the table 14, and the measured value is outputted into the inertia calculating unit 98 to calculate the load inertia J.

Next, referring to FIG. 6, another embodiment of the present invention will be explained below. Like reference characters are used to indicate like parts in various views including FIG. 6.

As described before, in the servo control unit 52 (FIGS. 1 to 5), NC program 42 reads and interprets the program reading and interpreting unit 44, the program execution command unit 48 draws the interpreted program temporarily stored in the interpreted program storing unit 46 then, the feed shaft motors $M_X$, $M_Y$ and $M_Z$ of the numerically controlled machine tool 10 shown in FIG. 1 are controlled according to the movement command outputted from the movement command distributing control unit 50. When acceleration and deceleration of the feed shaft motors are repeated in a short period, the feed shaft motor driving unit 54 and feed shaft motors $M_X$, $M_Y$ and $M_Z$ are heated. When the temperature reaches the allowable upper limit, the thermal alarm is raised, so that the numerically controlled machine tool is stopped in emergency.

Time constant of acceleration and deceleration of the feed shaft suitable for the numerically controlled machine tool 10, the relation between the torque command or electric current command, which is taken out from the servo control unit 52, and the temperature of each feed shaft motor $M_X$, $M_Y$, $M_Z$, temperature curve presenting changes in temperatures of feed shaft motors $M_X$, $M_Y$, $M_Z$ when the rated currents are continuously supplied to feed shaft motors $M_X$, $M_Y$, $M_Z$, and relations between the inclinations Q of the temperature curves and the time constants of acceleration and deceleration of the feed shafts are previously determined by experiments and stored in the data storing unit 110. Further, parameters presenting the sizes of the feed shaft motors $M_X$, $M_Y$, $M_Z$ and the feed shaft motor driving unit 54 are also stored in the data storing unit 110. The temperature calculating unit 112 calculates and estimates temperatures of the drive means such as feed shaft motors $M_X$, $M_Y$, $M_Z$ every moment by collating the torque command or electric current command taken out from the servo control unit 52 with the relations between the torque command or electric current command and the temperatures of feed shaft motors $M_X$, $M_Y$, $M_Z$.

The acceleration and deceleration time constant calculating unit 114 receives a result of calculation sent from the temperature calculating unit 112, and calculates an acceleration and deceleration time constant of the feed shaft of every moment based on the relation between the inclination of the temperature curve (not shown) and the acceleration and deceleration time constant stored in the data storing unit 110, and outputs acceleration and deceleration time constant of the feed shaft. The acceleration and deceleration time constant commanding unit 116 gives a command of the acceleration and deceleration time constant of the feed shaft of every moment from the acceleration and deceleration time constant calculating unit 114 to the movement command distribution control unit 50 just in time with the progress of operation of the numerically controlled machine tool 10. In this connection, at the initiation of control, predetermined acceleration and deceleration time constant T0 of the feed shaft is directly sent to the movement command distribution control unit 50 from the data storing unit 110.

Figure 10:
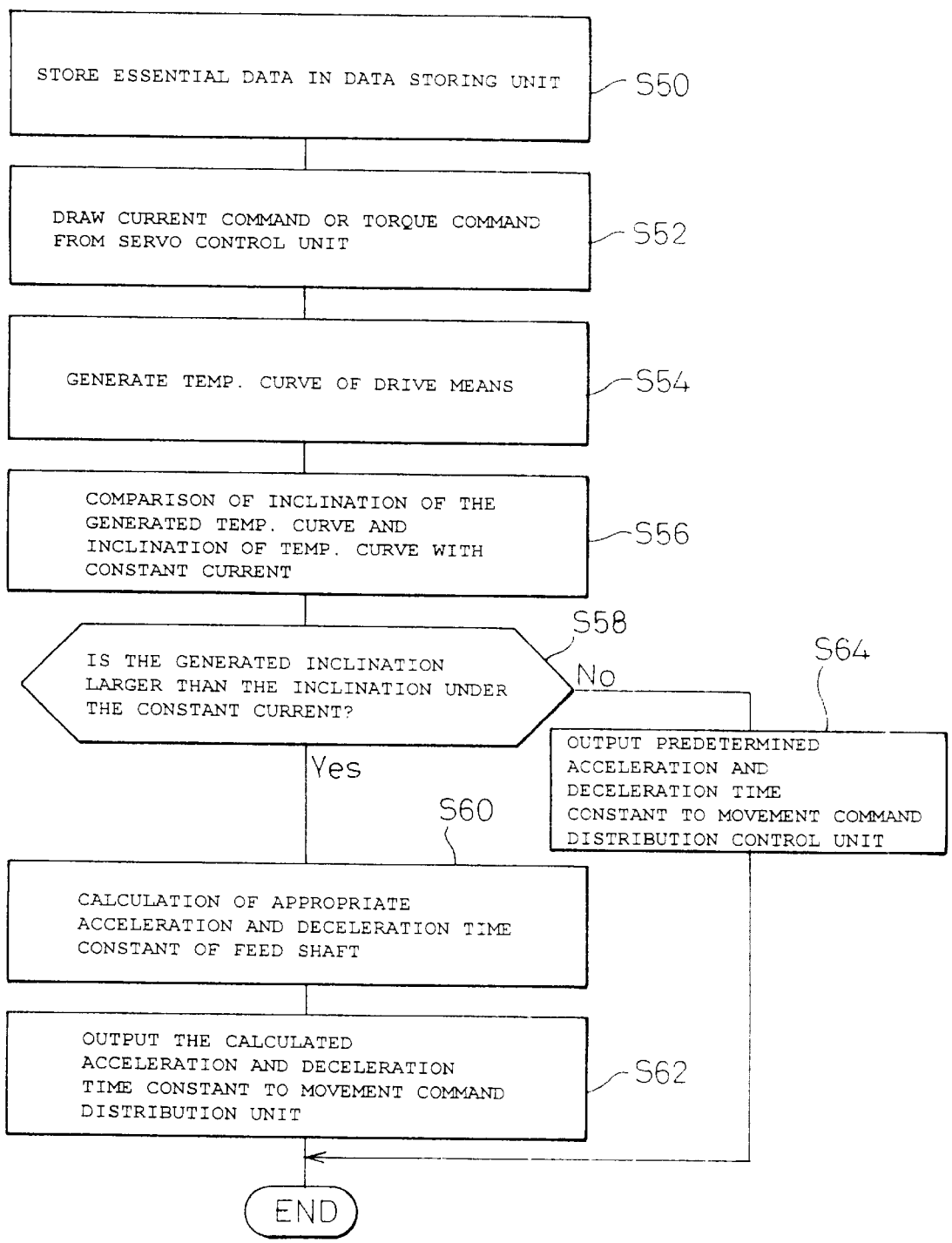
FIG. 10 is a flow chart showing a controlling method of the fifth embodiment of the present invention.

Next, referring to FIG. 10, operation of this embodiment will be explained below.

First, necessary data are set in the data storing unit 110 (step S50). As described above, the necessary data are: the acceleration and deceleration time constant of the feed shaft suitable for the numerically controlled machine tool 10; the relations between the torque command or electric current command from the servo control unit 52 and the temperatures of each feed shaft motors $M_X$, $M_Y$, $M_Z$; the temperature curves (not shown) presenting changes in the temperatures of the feed shaft motors $M_X$, $M_Y$, $M_Z$ when the rated currents are continuously supplied to feed shaft motors $M_X$, $M_Y$, $M_Z$; the relations between the inclinations of the temperature curves and the acceleration and deceleration time constant of the feed shafts; and the parameters presenting the sizes of feed shaft motors $M_X$, $M_Y$, $M_Z$ and driving unit 54. These are previously determined by experiments and stored during the manufacture of the numerically controlled machine tool 10. When the numerically controlled machine tool 10 is operated according to NC program 42, the torque command or electric current command is successively put into the temperature calculating unit 112 (step S112) from the servo control unit 52.

Figure 11:
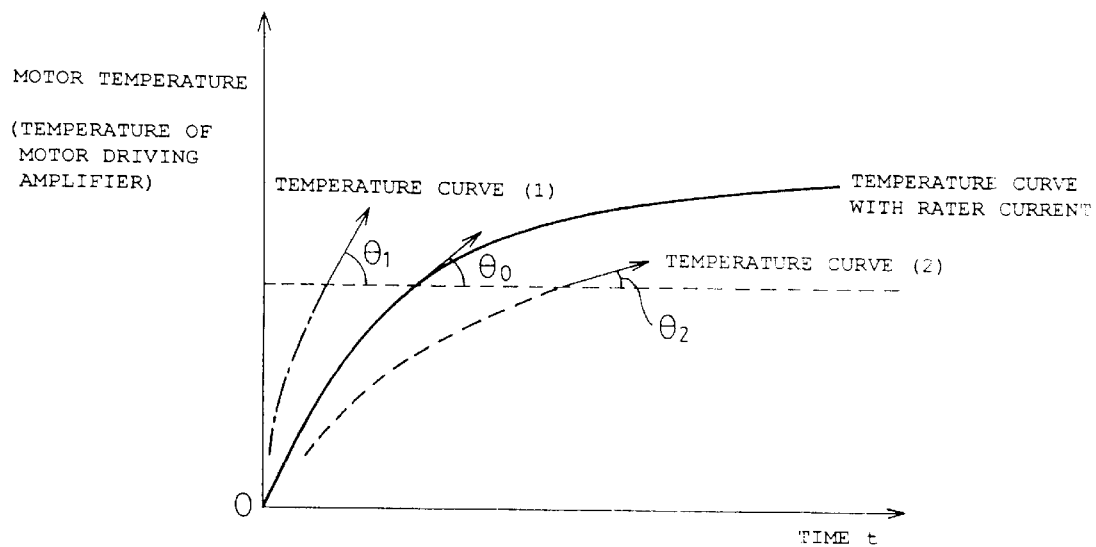
FIG. 11 is a graph showing a temperature curve of the feed shaft motor which is made in the fifth embodiment of the present invention.

The temperature calculating unit 112 collates the torque command or electric current command with the relation between the torque command or electric current command and the temperature of the drive means of feeds motors $M_X$, $M_Y$, $M_Z$ stored in the data storing unit 110 to calculate and estimate the temperature of the drive means at every moment, and makes the temperature curve of the drive means with respect to the lapse of time, for example, the temperature curves (1) and (2) shown in FIG. 11 (step S54). The acceleration and deceleration time constant calculating unit 114 compares the instantaneous inclination θ of the temperature curve with the inclination $θ_0$ at the same temperature (temperature MT1 in FIG. 11), of the temperature curve for the rated current which previously set in step S50, (step S56). In the case of temperature curve (1), the instantaneous inclination θ is $θ_1$, and in the case of temperature curve (2), the instantaneous inclination θ is $θ_2$. The result of comparison is applied to the relation between inclination θ of the temperature curve shown in FIG. 12 and acceleration and deceleration time constant T of the feed shaft.

Figure 12:
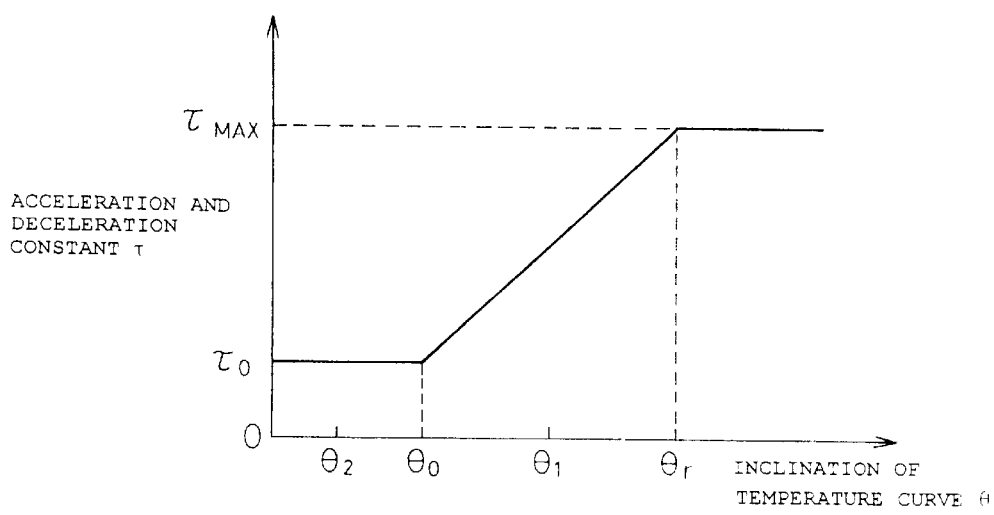
FIG. 12 is a graph showing a relation between inclination θ of the temperature curve and acceleration and deceleration time constant τ in the fifth embodiment of the present invention.

If $θ>θ_0$ (when the result is "Yes" in step S58, such as $θ=θ_1$), an acceleration and deceleration time constant higher than T0 is calculated based on the relation shown in FIG. 12 (step S60) and outputted into the movement command distribution control unit 50 via the acceleration and deceleration time constant command unit 116 (step S62). If of $θ>θ_0$ (when the result is "No" in step S52, such as $θ=θ_2$), acceleration and deceleration constant T0 of the feed shaft, which is previously set in step S50, is sent as it is to the movement command distribution control unit 50 via the acceleration and deceleration time constant command unit 116 (step S64).

In FIG. 12, acceleration and deceleration time constant T of the feed shaft has upper limit Tmax, which does not allow overheat of the drive means even if acceleration and deceleration are continuously repeated. There exists a minimum inclination θP of the temperature curve which corresponds to Tmax. That is, in a range in which θ is higher than θP, T is Tmax. In this connection, the temperature curve of the drive means is not limited to that shown in FIG. 11. The temperature curve of the drive means may be expressed in the form of a table in which the relation between the time and inclination θ is expressed by a predetermined time period. The present embodiment includes a method in which the temperatures of the feed shaft motors are calculated and estimated by the number of times of accelerations and decelerations of the feed shafts, or the temperatures of the feed shaft motors are actually detected by temperature detecting sensors, to accelerate and decelerate the feed shafts based on the result of comparison of the temperatures thus obtained with the allowable temperature.

The preferred embodiments of the present invention are explained above. However, it should be noted that the present invention is not limited to the above specific embodiments, and variations and modifications may be made by one skilled in the art without departing from the spirit and scope of the present invention.

Figure 6:
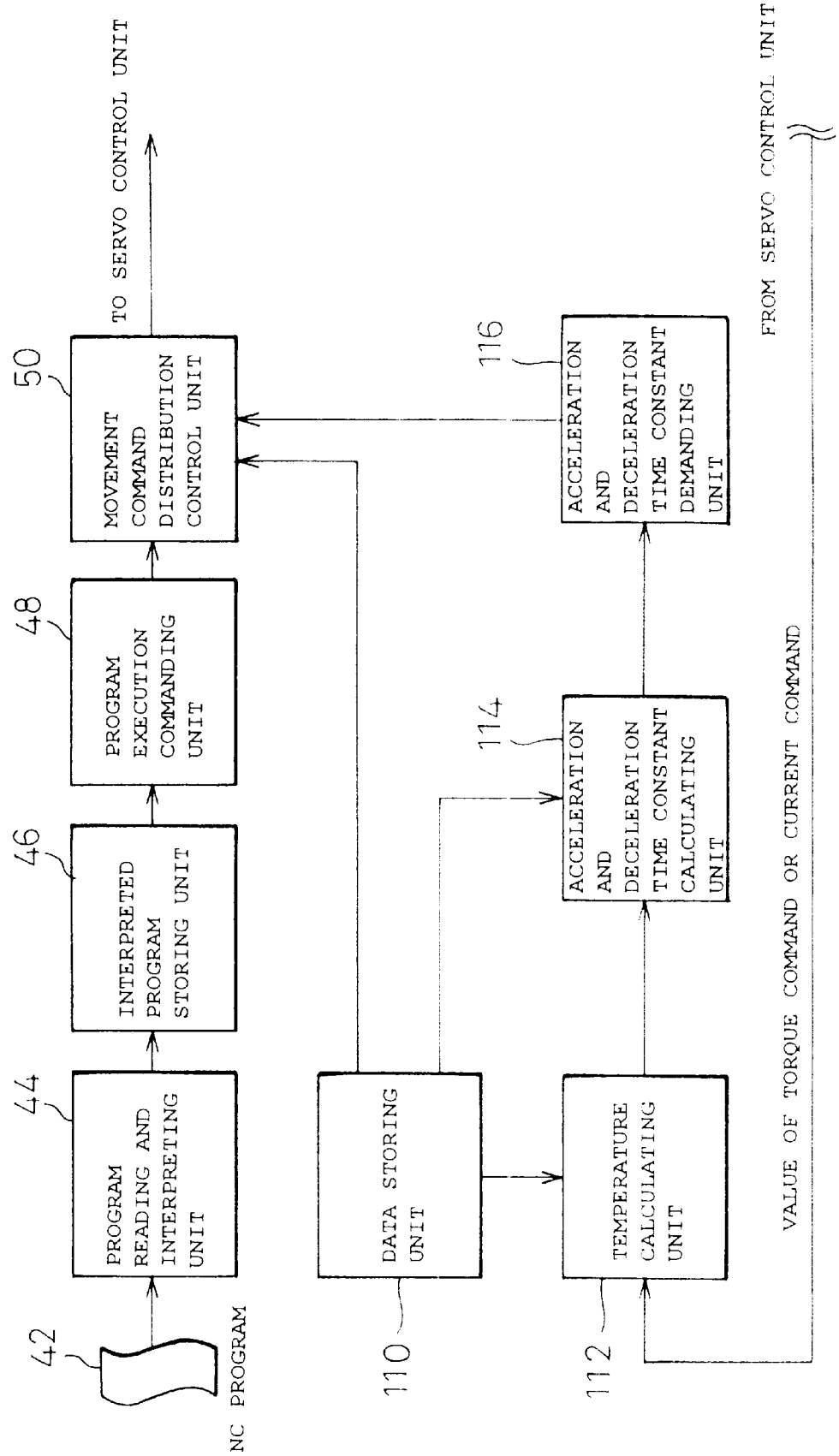
FIG. 6 is a block diagram showing a structure of the fifth embodiment of the control unit for controlling the numerically controlled machine tool of the present invention.

For example, in the embodiment described above, so called backlash acceleration correcting control in FIGS. 2 and 3, inertia correcting control in FIGS. 4 and 5, and acceleration and deceleration control of the feed shaft motors in FIG. 6 are described separately. However, advantageously combining the above various types of control are appropriately with each other will provide a highly efficientive and accurate machining process.

In the above description, the numerically controlled machine tool of the present invention is a horizontal type machining center having three orthogonal axes of X, Y and Z-axis as shown in FIG. 1. However, it should be noted that the present invention is not limited to the above specific machine. For example, in addition to the three axes of X-, Y- and Z-axis, it is possible to provide the two axes of A- and B-axis by which the table 14 can be turned round a horizontal axis, that is, the present invention may be applied to the five axis type numerically controlled machine tool. Further, the present invention may be applied to the four axis type numerically controlled machine tool having the four axes of X-, Y-, Z- and A-axis, or alternatively the present invention may be applied to the four axis type numerically controlled machine tool having the four axes of X-, Y-, Z- and B-axis, and furthermore the present invention may be applied to the numerically controlled machine, the number of axes of which is not less than six. Furthermore, the present invention can be applied to not only the horizontal type machining center shown in FIG. 1 but also vertical type machining centers and other numerically controlled machine tools such as a milling machine. Furthermore, the present invention can be applied to electric discharge diesinking machines having the three axes of X-, Y- and Z-axis. Also, the present invention can be applied to the wire electrical discharge machine having the four axes of X-, Y-, U- and V-axis.

The calculation control unit 56, detecting unit 66, acceleration calculating unit 68, load torque calculating unit 70, static friction correcting unit 80, inertia calculating unit 96 and inertia storing unit 98 are components which are functionally independent from the numerically control unit 40. Therefore, these components may be housed in the common casing with the numerically control unit 40. Alternatively, these components may be housed in a casing of the machine control unit which is arranged separately from the casing for the numerically control unit 40.

What is claimed is:

1. A method of controlling a numerically controlled machine tool having a plurality of feed shafts of three orthogonal X-, Y-, and Z-axes or at least one of rotary shafts of A-, B- and C-axes in addition to a plurality of feed shafts of three orthogonal X-, Y-, and Z-axes, characterized in that the method comprises the steps of:

taking numerical controlling program data from a reading and interpreting unit provided in a numerically controlling device to execute the program data in a movement command distribution controlling unit and a servo control unit;

estimating an appropriate torque or electric current command corresponding to the changes in frictional force in the feed mechanisms of the respective feed shafts or in the weight of a workpiece based on the results of execution of the numerically controlling program data outputted from the servo control unit;

outputting the estimated appropriate torque or electric current command to motor drive means of the feed shafts; and driving feed motors by the appropriate torque or electric current command corresponding to the changes in frictional force in the feed mechanisms of the respective feed shafts or in the weight of a workpiece.

2. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

taking the torque or electric current command outputted from the servo motor control unit to the feed shaft motor driving means;

estimating a desired torque or electric current command corresponding to the changes in frictional force in the feed mechanisms of the respective feed shafts or in the weight of a workpiece based on the results of execution of the numerically controlling program data outputted from the servo control unit;

outputting the estimated desired torque or electric current command to motor drive means of the feed shafts; and driving feed motors by the desired torque or electric current command.

3. A method of controlling a numerically controlled machine tool according to claim 2, characterized in that the estimation of the desired torque or electric current command corresponding to the changes in frictional force in the feed mechanisms or in the weight of a workpiece is an estimation of a torque or electric current command corresponding to the changes in frictional force in the feed mechanisms or in the weight of a workpiece based on the torque or electric current command and the acceleration of the feed shaft, which have been taken.

4. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

detecting an inversion of the direction of movement of the feed shaft or an initiation of movement of the stationary feed shaft;

calculating the acceleration of the feed shaft at the time when the inversion of the direction of movement of the feed shaft is detected;

calculating the load torque based on the torque electric current command outputted from the servo control unit at the time when the inversion of the direction of movement of the feed shaft is detected to set it as the load torque before the inversion of the direction of movement of the feed shaft;

inverting the sign of value of the load torque and multiplying the load torque before the inversion of the direction of movement of the feed shaft by a predetermined constant to set the product as a target value for the load torque for the operation after the inversion of the direction of movement of the feed shaft;

calculating a load torque for the operation after the direction of movement of the feed shaft is inverted, between the time of the detection of the inversion of the direction of movement of the feed shaft and the time when the load torque reaches the target value, by using a time constant expressed as a function of acceleration at the time of the inversion of the direction of the feed shaft;

calculating a desired torque or electric current command based on the load torque after the direction of movement of the feed shaft is inverted;

outputting the desired torque or electric current command to motor drive means of the feed shafts; and moving the moving body by the feed shaft motor and the feed mechanism.

5. A method of controlling a numerically controlled machine tool according to claim 4, wherein the load torque after the inversion of the direction of movement of the feed shaft is calculated by using a time constant which is in inverse proportion to square root of the acceleration at the time when the inversion of the direction of movement of the feed shaft is detected.

6. A method of controlling a numerically controlled machine tool according to claim 4, wherein the load torque after the inversion of the direction of movement of the feed shaft is calculated by using a plurality of time constants which are in inverse proportion to square root of the acceleration at the time when the inversion of the direction of movement of the feed shaft is detected.

7. A method of controlling a numerically controlled machine tool according to claim 4, wherein the calculation of the load torque after the inversion of the direction of movement of the feed shaft is terminated by a ratio until the set point of load torque reaches or by a distance from the feed shaft when an inversion of the direction of movement of the feed shaft is detected.

8. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

setting previously a desired torque command and a speed command or a desired electric current command and a speed command, depending on the static frictional force in the feed mechanism;

calculating a torque or electric current command, based on a moving command value outputted from the movement command distribution controlling unit, in the servo control unit to output to the feed motor driving means to drive the feed motor;

detecting an inversion of the direction of movement of the feed shaft or an initiation of movement of the stationary feed shaft;

outputting, when the inversion of the direction of movement of the feed shaft or the initiation of movement of the stationary feed shaft is detected, the desired torque command and the speed command or the desired electric current command and the speed command, which are previously set, to the feed shaft motor driving means and servo control means; and moving the moving body by the feed shaft motor and feed mechanism.

9. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

setting previously a desired torque command and a speed command or a desired electric current command and a speed command, depending on the static frictional force in the feed mechanism;

calculating a torque or electric current command, based on a moving command value outputted from the movement command distribution controlling unit, in the servo control unit to output to the feed motor driving means to drive the feed motor;

detecting an inversion of the direction of movement of the feed shaft or an initiation of movement of the stationary feed shaft;

calculating the acceleration of the feed shaft at the time when the inversion of the direction of movement of the feed shaft is detected;

calculating the load torque based on the torque electric current command outputted from the servo control unit at the time when the inversion of the direction of movement of the feed shaft is detected to set it as the load torque before the inversion of the direction of movement of the feed shaft;

inverting the sign of value of the load torque and multiplying the load torque before the inversion of the direction of movement of the feed shaft by a predetermined constant to set the product as a target value for the load torque for the operation after the inversion of the direction of movement of the feed shaft;

calculating a load torque for the operation after the direction of movement of the feed shaft is inverted, between the time of the detection of the inversion of the direction of movement of the feed shaft and the time when the load torque reaches the target value, by using a time constant expressed as a function of acceleration at the time of the inversion of the direction of the feed shaft;

calculating a desired torque or electric current command based on the load torque after the direction of movement of the feed shaft is inverted;

outputting the desired torque or electric current command to motor drive means;

outputting, when the inversion of the direction of movement of the feed shaft or the initiation of movement of the stationary feed shaft is detected, the desired torque command and the speed command or the desired electric current command and the speed command, which are previously set, to the feed shaft motor driving means and servo control means; and moving the moving body by the feed shaft motor and feed mechanism.

10. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor drive means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

taking the torque or electric current command outputted to the feed shaft motor drive means through the servo control unit as a torque or electric current command for the moving feed shaft;

calculating a load inertia based on the torque or electric current command for the moving feed shaft and the acceleration in the feed shaft;

calculating a desired torque or electric current command corresponding to the calculated load inertia;

outputting the desired torque or electric current command to the feed shaft motor drive means; and moving the moving body by the feed shaft motor and the feed mechanism.

11. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor drive means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

detecting the weight of a workpiece or a moving body to which the workpiece is mounted;

calculating a load inertia based on the detected weight;

calculating a desired torque or electric current command based on the calculated load inertia;

outputting the desired torque or electric current command to the feed shaft motor drive means; and moving the moving body by the feed shaft motor and the feed mechanism.

12. A method of controlling a numerically controlled machine tool including the steps of taking numerical controlling program data from a reading and interpreting unit provided in a numerically controlling device to execute the program data in a movement command distribution controlling unit and a servo control unit; and outputting the execution to motor drive means of the feed shafts through feed shaft motor driving means to move a moving body by a feed mechanism, characterized in that the method comprises the steps of:

calculating a torque or electric current command, based on a moving command value outputted from the movement command distribution controlling unit, in the servo control unit to output to the feed motor driving means to drive the feed motor;

setting and storing a time constant of acceleration and deceleration of the feed shaft and allowable temperature data for feed shaft motor;

taking the torque or electric current command outputted from the servo control unit to the feed motor driving means;

estimating the temperature of the feed shaft motor based on the taken torque or electric current command;

comparing the previously stored allowable temperature data and the estimated temperature of the feed shaft motor;

calculating an acceleration or deceleration time constant based on the comparison results;

estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means;

outputting the estimated desired torque or electric current command to the feed shaft motor drive means; and moving the moving body by the feed shaft motor and the feed mechanism.

13. A numerically controlled machine tool having a plurality of feed shafts of three orthogonal X-, Y-, and Z-axes or at least one of rotary shafts of A-, B-and C-axes in addition to a plurality of feed shafts of three orthogonal X-, Y-, and Z-axes, characterized in that the numerically controlled machine tool comprises:

a feed mechanism for moving a moving body of each feed shaft;

a feed shaft motor for driving the feed mechanism;

a feed shaft motor drive means for driving the feed shaft motor;

a numerically controlling means for executing the numerically controlled program data to drive the feed shaft motor by a moving command distribution controlling unit and a servo control unit and for outputting the result of execution to the feed shaft motor through the feed shaft motor drive means;

a calculation controlling means for estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means when the feed shaft motor is driven to output the estimated desired torque or electric current command to the feed shaft motor drive means.

14. A numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a feed mechanism for moving a moving body of each feed shaft;

a feed shaft motor for driving the feed mechanism;

a feed shaft motor drive means for driving the feed shaft motor;

a numerically controlling means for executing the numerically controlled program data to drive the feed shaft motor by a moving command distribution controlling unit and a servo control unit and for outputting the result of execution to the feed shaft motor through the feed shaft motor drive means;

a calculation controlling means for estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means when the feed shaft motor is driven to output the estimated desired torque or electric current command to the feed shaft motor drive means.

15. A numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling unit;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a detecting means for detecting an inversion of the direction of movement of the feed shaft;

an acceleration calculating means for calculating an acceleration when an inversion of the direction of movement of feed shaft by the detecting means; and a load torque calculating means for calculating a load torque after the inversion of the direction of movement of the feed shaft by using a time constant expressed by a function of the toque command or the electric current command outputted from the speed control means at the time when the inversion of the direction of movement of the feed shaft is detected by the detecting means and the acceleration, calculated by the acceleration calculating means, when the inversion of the direction of movement of the feed shaft is detected to output the calculated desired torque or electric current command corresponding to the load torque to the speed control means.

16. A numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling unit;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a detecting means for detecting an inversion of the direction of movement of the feed shaft or the initiation of movement of the stationary feed shaft; and a static friction correcting means for outputting predetermined desired torque command and speed command or electric current command and speed command, to the feed shaft motor drive means and the speed control means, corresponding to the static frictional force of the feed mechanism when the inversion of the direction of movement of the feed shaft or the initiation of the movement of the feed shaft is detected by the detecting means.

17. A numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling unit;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a detecting means for detecting an inversion of the direction of movement of the feed shaft or the initiation of movement of the stationary feed shaft; and an acceleration calculating means for calculating the acceleration when the detecting means detects the inversion of the direction of movement of the feed shaft;

a load torque calculating means for calculating a load torque after the inversion of the direction of movement of the feed shaft by using a time constant expressed by a function of the torque command or the electric current command outputted from the speed control means at the time when the inversion of the direction of movement of the feed shaft is detected by the detecting means and the acceleration, calculated by the acceleration calculating means, when the inversion of the direction of movement of the feed shaft is detected to output the calculated desired torque or electric current command corresponding to the load torque to the speed control means;

a static friction correcting means for outputting predetermined desired torque command and speed command or electric current command and speed command, to the feed shaft motor drive means and the speed control means, corresponding to the static frictional force of the feed mechanism when the inversion of the direction of movement of the feed shaft or the initiation of the movement of the feed shaft is detected by the detecting means.

18. A numerically controlled machine tool including a numerically controlling device which has a reading and interpreting unit, a movement command distribution controlling unit for executing a numerical control program data, which has been drawn from the reading an interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling unit;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a speed feedforward control means for estimating a speed command based on the movement command of the feed shaft outputted from the movement command distribution controlling unit by calculation to output the speed command to the speed control means;

an acceleration feedforward control means for estimating an acceleration or torque command of the feed shaft outputted from the movement command distribution controlling unit by calculation to output the acceleration or torque command to the feed shaft motor drive means; and an inertia calculating means for calculating a load inertia based on the torque or electric current command, outputted to the feed shaft motor drive means from the speed control means, and the acceleration of the feed shaft to output the load inertia to the speed control means and the acceleration feed forward control means, the speed control means outputs a desired torque or electric current command based on the load inertia, calculated by the inertia calculating means, to the feed shaft motor drive means.

19. A numerically controlled machine tool including a numerically controlling device which has a reading and interpreting unit, a movement command distribution controlling unit for executing a numerical control program data, which has been drawn from the reading and interpreting unit, the result of execution being outputted to a feed shaft motor of a feed shaft through a feed shaft motor drive means to move a moving body by a feed mechanism, characterized in that the numerically controlled machine tool comprises:

a position control means for calculating a speed command based on a movement command of the feed shaft outputted from the movement command distribution controlling unit;

a speed control means for calculating a torque command or an electric current command based on the speed command of the feed shaft outputted from the position control means;

a feed shaft motor drive means for outputting an electric current to drive the feed shaft motor according to the torque command of the feed shaft or the electric current command outputted from the speed control means;

a speed feedforward control means for estimating a speed command based on the movement command of the feed shaft outputted from the movement command distribution controlling unit by calculation to output the speed command to the speed control means;

an acceleration feedforward control means for estimating an acceleration or torque command of the feed shaft outputted from the movement command distribution controlling unit by calculation to output the acceleration or torque command to the feed shaft motor drive means;

a weight detecting means for detecting the weight of a workpiece or a moving body to which the workpiece is mounted; and an inertia calculating means for calculating a load inertia based on the torque or electric current command, outputted to the feed shaft motor drive means from the speed control means, and the acceleration of the feed shaft to output the load inertia to the speed control means and the acceleration feed forward control means, the speed control means outputting a desired torque or electric current command based on the load inertia, calculated by the inertia calculating means, to the feed shaft motor drive means.

20. A feed mechanism for moving a moving body of each feed shaft;

a feed shaft motor for driving the feed mechanism;

a feed shaft motor drive means for driving the feed shaft motor;

a numerically controlling means for executing the numerically controlled program data to drive the feed shaft motor by a moving command distribution controlling unit and a servo control unit and for outputting the result of execution to the feed shaft motor through the feed shaft motor drive means;

a data storage means for storing a time constant of acceleration and deceleration of the feed shaft and allowable temperature data for feed shaft motor;

a temperature calculating means for estimating, through a calculation, the temperature of the feed shaft motor based on the torque or electric current command outputted to the feed shaft motor drive means from the servo control unit;

an acceleration or deceleration time constant calculating means for setting an acceleration or deceleration time constant based on a comparison between the allowable temperature data previously stored in the data storage means and the temperature of the feed shaft motor estimated by the temperature calculating means to output the resultant time constant to the moving command distribution controlling unit; and a calculation controlling means for estimating a desired torque command or an electric current command corresponding to a change in the frictional force of the feed mechanism or the weight of a workpiece obtained based on the torque command or the electric current command and the acceleration of the feed shaft outputted from the servo control unit to the feed shaft motor drive means when the feed shaft motor is driven to output the estimated desired torque or electric current command to the feed shaft motor drive means.

* * * * *

Disclaimer

6,566,835 — Jun Yoshida, Kanagawa (JP); Yoshikatsu Teraoka, Kanagawa (JP). NC MACHINE TOOL, AND METHOD OF CONTROLLING NC MACHINE TOOL. Patent dated May 20, 2003. Disclaimer file July 18, 2005, by the assignee, Makino Milling Machine Co., Ltd.

Hereby enter this disclaimer to claims 1-20, of said Patent.

*(Official Gazette, October 11, 2005)*